United States Patent
Naumov

(10) Patent No.: US 11,961,001 B2
(45) Date of Patent: Apr. 16, 2024

(54) PARALLEL FORWARD AND BACKWARD PROPAGATION

(71) Applicant: NVIDIA Corporation, Santa Clara, CA (US)

(72) Inventor: Maxim Andreyevich Naumov, Redwood City, CA (US)

(73) Assignee: NVIDIA Corporation, Santa Clara, CA (US)

( * ) Notice: Subject to any disclaimer, the term of this patent is extended or adjusted under 35 U.S.C. 154(b) by 797 days.

(21) Appl. No.: 16/216,720

(22) Filed: Dec. 11, 2018

(65) Prior Publication Data

US 2019/0188569 A1 Jun. 20, 2019

Related U.S. Application Data

(60) Provisional application No. 62/599,545, filed on Dec. 15, 2017.

(51) Int. Cl.
*G06N 3/084* (2023.01)
*G06N 3/045* (2023.01)
*G06N 3/082* (2023.01)
*G06N 5/046* (2023.01)

(52) U.S. Cl.
CPC ............ *G06N 3/084* (2013.01); *G06N 3/045* (2023.01); *G06N 5/046* (2013.01)

(58) Field of Classification Search
CPC ....... G06N 3/084; G06N 3/0454; G06N 5/046
See application file for complete search history.

(56) References Cited

U.S. PATENT DOCUMENTS

| 6,754,589 | B2 | 6/2004 | Bush |
| 9,704,257 | B1 | 7/2017 | Tuzel et al. |
| 2017/0193361 | A1 | 7/2017 | Chilimbi et al. |
| 2018/0157964 | A1 | 6/2018 | Hsu et al. |

(Continued)

FOREIGN PATENT DOCUMENTS

| CN | 106169081 A | 11/2016 |
| CN | 106599941 A | 4/2017 |
| CN | 106991474 A | 7/2017 |

(Continued)

OTHER PUBLICATIONS

Dean et al. "Large Scale Distributed Deep Networks." In NIPS, 2012. 11 pages. (Year: 2012).*

(Continued)

*Primary Examiner* — Marc S Somers
*Assistant Examiner* — Asher H. Jablon
(74) *Attorney, Agent, or Firm* — Leydig, Voit & Mayer, Ltd.

(57) ABSTRACT

A neural network structure is separated into an odd neural network including only the odd layers and an even neural network including only the even layers. In order to allow for parallel execution, for forward propagation a second input is generated from the original input, while for backward propagation a second error gradient is generated. Parallel execution may accelerate the forward and backward propagation operations without significant change in accuracy of the model. Additionally, restructuring a single neural network into two or more parallel neural networks may reduce the total time needed for training.

20 Claims, 10 Drawing Sheets

(56) References Cited

U.S. PATENT DOCUMENTS

2019/0043832 A1* 2/2019 Teig .................... G06F 11/1423
2021/0295166 A1* 9/2021 Rouhani ................ G06N 3/084

FOREIGN PATENT DOCUMENTS

| CN | 107886049 A | 4/2018 |
|----|-------------|--------|
| CN | 107992131 A | 5/2018 |
| CN | 108021395 A | 5/2018 |
| CN | 108038445 A | 5/2018 |
| WO | 2018154494 A1 | 8/2018 |

OTHER PUBLICATIONS

Ergen et al. "Online Training of LSTM Networks in Distributed Systems for Variable Length Data Sequences." Oct. 24, 2017. arXiv: 1710.08744v1 (Year: 2017).*

Teerapittayanon et al. "Distributed Deep Neural Networks over the Cloud, the Edge and End Devices." Jul. 17, 2017. In 2017 IEEE 37th International Conference on Distributed Computing Systems. (Year: 2017).*

Nasse et al. "Face Detection Using GPU-Based Convolutional Neural Networks." CAIP 2009, LNCS 5702, pp. 83-90, 2009. (Year: 2009).*

Koch et al. "Siamese Neural Networks for One-shot Image Recognition." Proceedings of the 32nd International Conference on Machine Learning, Lille, France, 2015. JMLR: W&CP vol. 37. 8 Pages (Year: 2015).*

N. McLaughlin, J. Martinez del Rincon and P. Miller, "Recurrent Convolutional Network for Video-Based Person Re-identification," 2016 IEEE Conference on Computer Vision and Pattern Recognition (CVPR), 2016, pp. 1325-1334 (Year: 2016).*

Kim et al. "SplitNet: Learning to Semantically Split Deep Networks for Parameter Reduction and Model Parallelization." Aug. 11, 2017. Proceedings of the 34th International Conference on Machine Learning, PMLR 70:1866-1874 (Year: 2017).*

Falgout et al., "Parallel time integration with multigrid", 2014, In Proceedings in Applied Mathematics and Mechanics, 2 pages (Year: 2014).*

Naumov, "Parallel Complexity of Forward and Backward Propagation," ISF Nov. 28, 2017, 18 pages. Retrieved from https://arxiv.org/pdf/1712.06577.pdf.

Amin et al., "Customizing Parallel Formulations of Backpropagation Learning Algorithm to Neural Network Architectures: A Summary of Results," Frontiers of Massively Parallel Computation, Nov. 1990, 9 pages. Retrieved from https://www.computer.org/csdl/proceedings/tai/1994/6785/00/00346497.pdf.

Moawad et al., "Neural networks and back-propagation explained in a simple way," Medium.com, Feb. 1, 2018, 24 pages. Retrieved from https://medium.com/datathings/neural-networks-and-backpropagation-explained-in-a-simple-way-f540a3611f5e.

* cited by examiner

PARALLEL FORWARD AND BACKWARD PROPAGATION

CLAIM OF PRIORITY

This application claims the benefit of U.S. Provisional Application No. 62/599,545 titled "Parallel Complexity of Forward and Backward Propagation," filed Dec. 15, 2017, the entire contents of which is incorporated herein by reference.

TECHNICAL FIELD

The present disclosure relates to neural networks and, more particularly to parallel forward and backward propagation.

BACKGROUND

Training a neural network model that includes multiple layers is accomplished by propagating input training data forward through each layer to produce output data. The output data is compared to a desired output or ground truth data corresponding to the input training data to generate error data. The error data is then back propagated through each layer, starting at the last layer, to update parameter values associated with each layer. As the number of layers in the neural network model increases, the amount of time required to train the neural network model typically increases. There is a need for addressing these issues and/or other issues associated with the prior art.

SUMMARY

A method, computer readable medium, and system are disclosed for parallel forward and backward propagation through parallel neural networks. A neural network model including multiple processing layers, alternating between odd and even processing layers, is restructured into an even neural network model including only the even processing layers and an odd neural network model including only the odd processing layers. A loss function is evaluated to produce an odd error gradient and an even error gradient. In an embodiment, the odd and even error gradients are back-propagated through the odd processing layers and the even processing layers, respectively, to update parameters of the parallel neural networks.

DETAILED DESCRIPTION

A neural network model that includes multiple layers may be restructured to produce parallel neural networks by separating the neural network model into an odd neural network including only the odd layers of the multiple layers and an even neural network including only the even layers of the multiple layers. In order to allow for parallel execution, a second input is generated from the original input for forward propagation. Similarly, a second error gradient is generated for backward propagation. The odd and even neural network models may each be recursively restructured to produce multiple odd and even neural network models in a parallel neural network system.

Computations may be performed in parallel during forward and/or backward propagation through the parallel neural networks. Parallel computations may accelerate the forward and backward propagation operations with an increase in memory consumption, but no significant change in accuracy. Furthermore, restructuring a single neural network into two or more parallel neural networks reduces the total time needed for training.

Figure 1A:
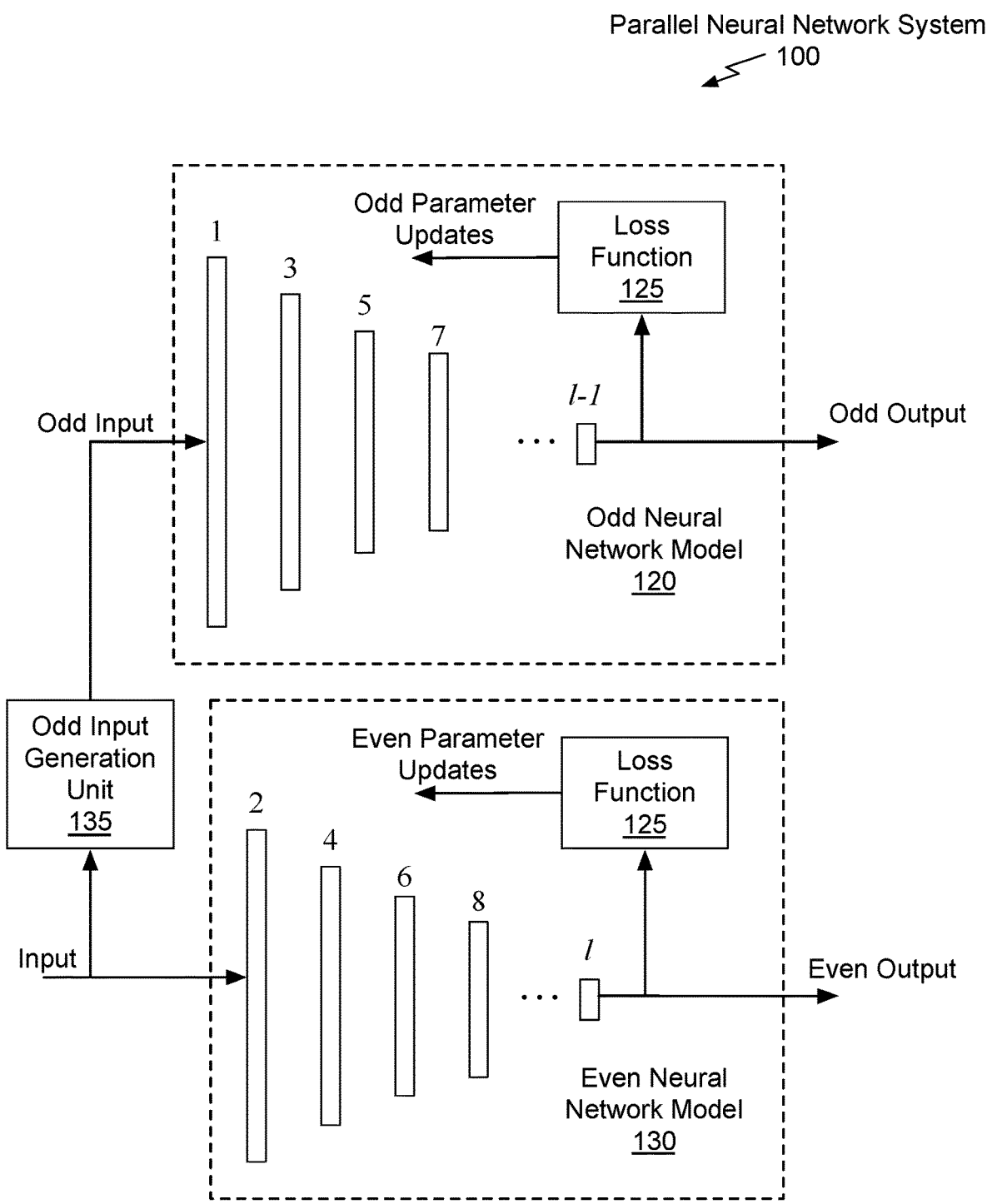
FIG. 1A illustrates a block diagram of parallel neural networks, in accordance with an embodiment.

FIG. 1A illustrates a block diagram of a parallel neural networks system 100, in accordance with an embodiment. Although the parallel neural networks system 100 is described in the context of processing units, one or more of the odd neural network model 120 and the even neural network model 130 may be implemented as a program, custom circuitry, or by a combination of custom circuitry and a program. For example, the odd neural network model 120 may be implemented by a GPU (graphics processing unit), CPU (central processing unit), or any processor capable of implementing layers of a neural network. Furthermore, persons of ordinary skill in the art will understand that any system that performs the operations of the parallel neural networks system 100 is within the scope and spirit of embodiments of the present disclosure.

The parallel neural networks system 100 includes an odd input generation unit 135, the odd neural network model 120, and the even neural network model 130. A neural network model including multiple processing layers, alternating between odd and even processing layers is restructured to produce the parallel neural network system 100. The odd input generation unit 135 receives the input to the even neural network model 130 and generates an odd input to the odd neural network model 120. The odd neural network model 120 includes only the odd processing layers (with modified weights) of the original neural network model and the even neural network model 130 includes only the even processing layers (with modified weights) of the neural network model.

The odd input is propagated in the forward direction through each successive odd processing layer in the odd neural network model 120 to produce the odd output. The approximate forward propagation may be performed simultaneously through the odd neural network model 120 and the even neural network model 130, resulting in faster prediction to generate the odd output and the even output. If an exact result is required then standard forward propagation can be performed.

A loss function 125 receives the odd output and a ground truth output and computes an odd error gradient. The input is propagated in the forward direction through each successive even processing layer in the even neural network model 130 to produce the even output. The loss function 125 receives the even output and a ground truth output and computes an even error gradient.

The odd error gradient is propagated backwards through each successive odd processing layer in the odd neural network model 120 to update odd parameter values for each of the odd processing layers. The even error gradient is propagated backwards through each successive even processing layer in the even neural network model 130 to update even parameter values for each of the even processing layers. The exact backward propagation may be performed simultaneously through the odd neural network model 120 and the even neural network model 130, resulting in faster training. One or more additional inputs may be processed by the parallel neural network system 100 using the updated parameter values to predict additional odd outputs and additional even outputs.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Figure 1B:
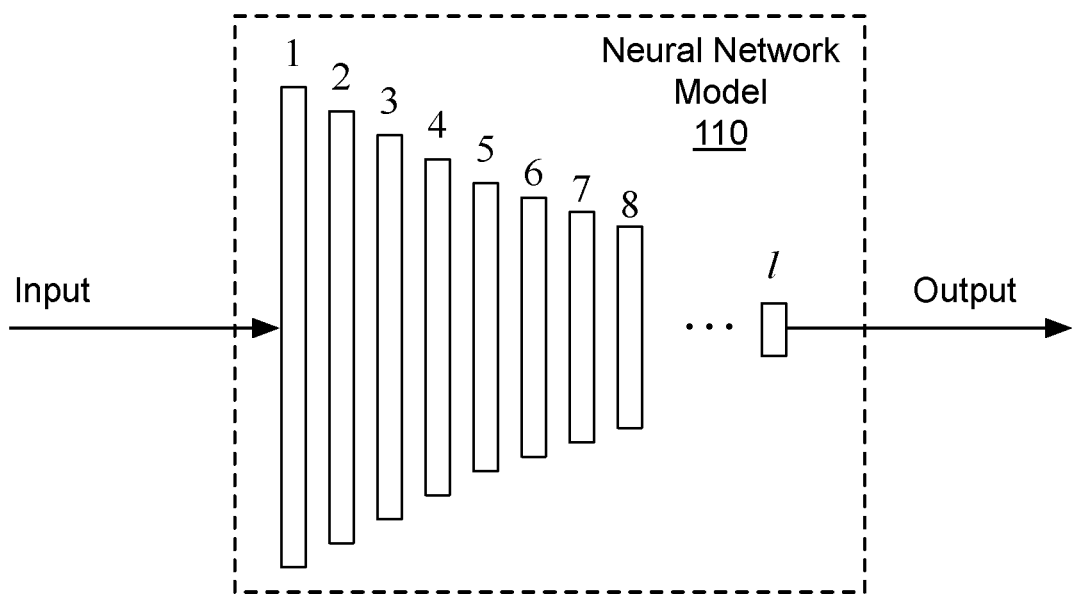
FIG. 1B illustrates a block diagram of a neural network model that is restructured to produce the parallel neural networks of FIG. 1A, in accordance with an embodiment.

FIG. 1B illustrates a block diagram of a neural network model 110 that is restructured to produce the parallel neural network system 100 of FIG. 1A, in accordance with an embodiment. In one embodiment, the neural network model 110 is a feedforward neural network and the odd neural network model 120 and the even neural network model 130 are also feedforward neural networks. In one embodiment, the neural network model 110 is a convolutional neural network and the odd neural network model 120 and the even neural network model 130 are also convolutional neural networks. In one embodiment, the neural network model 110 is a recurrent neural network and the odd neural network model 120 and the even neural network model 130 are also recurrent neural networks.

In an embodiment, intermediate odd data and intermediate even data generated by each of the odd and even processing layers during forward and/or backward propagation, respectively, in the parallel neural network system 100 match exactly or approximate intermediate data generated by each corresponding layer of the neural network model 110. In other words, mathematically equivalent results are achieved using the parallel neural network system 100 as with the neural network model 110.

Figure 1C:
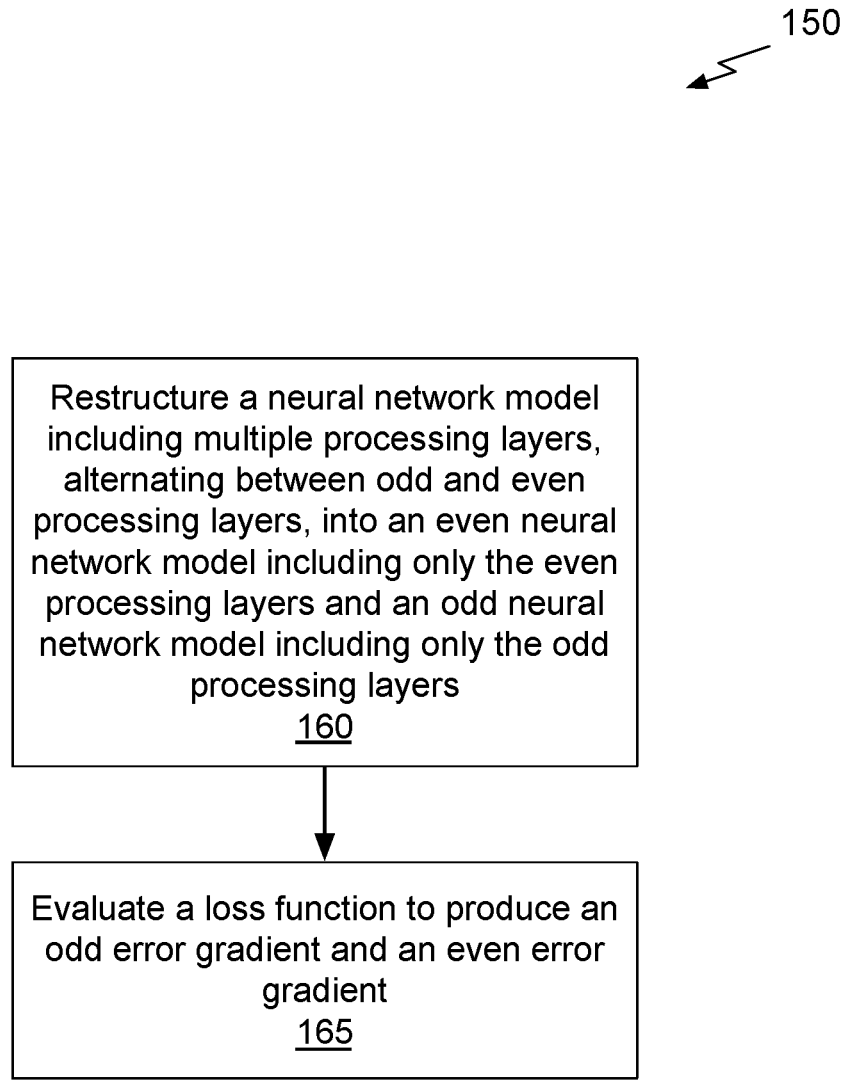
FIG. 1C illustrates a flowchart of a method for updating parameter values of the parallel neural networks shown in FIG. 1A, in accordance with an embodiment.

FIG. 1C illustrates a flowchart of a method 150 for updating parameter values of the parallel neural networks shown in FIG. 1A, in accordance with an embodiment. Although method 150 is described in the context of a processing unit, the method 150 may also be performed by a program, custom circuitry, or by a combination of custom circuitry and a program. For example, the method 150 may be executed by a GPU (graphics processing unit), CPU (central processing unit), or any processor capable of implementing a neural network model. Furthermore, persons of ordinary skill in the art will understand that any system that performs method 150 is within the scope and spirit of embodiments of the present disclosure.

At step 160, the neural network model 110 including multiple processing layers, alternating between odd and even processing layers, is restructured into the even neural network model 130 including only the even processing layers and the odd neural network model 120 including only the odd processing layers. The odd neural network model 120 and the even neural network model 130 comprise the parallel neural networks.

At step 165, a loss function 125 is evaluated to produce an odd error gradient and an even error gradient. The odd error gradient and the even error gradient are used to update values of parameters for the odd neural network model 120 and the even neural network model 130, respectively. In an embodiment, the parameters include weights and the odd error gradient and even error gradients are used to compute delta (difference) values that are combined with the weights to update the weights for each layer. In an embodiment, the parameters include bias delta values. In an embodiment, the error gradients and consequently the updated parameters for the layers of the parallel neural networks equal the updated parameters for the corresponding layer of the original neural network model 110. In other words, the values propagated forward and backward through the layers of the parallel neural networks are mathematically equivalent to the values propagated forward and backward for the original neural network model 110.

Forward and backward propagation can be formulated as a solution of lower and upper triangular systems of equations. For standard feedforward neural networks (FNNs) and recurrent neural networks (RNNs), the triangular systems are always block bi-diagonal, while for a general computation graph (directed acyclic graph) the triangular system can have a more complex triangular sparsity pattern. Direct and iterative parallel algorithms can be used to solve the triangular systems and interpreted as different ways of performing model parallelism. Also, for FNNs and RNNs with k layers and τ time steps the backward propagation can be performed in parallel in O(log k) and O(log k log τ) steps, respectively.

As previously explained, forward and backward propagation are used in training of neural networks. The training is an optimization procedure that minimizes the loss function $\mathcal{L}$ over data samples (x*,z*) in a data set D. The loss function measures on average the error ε(.,.) between the computed output of the neural network, $z^{(l)}$ and the correct solution z*, e.g. cross entropy error function $$\varepsilon(z^*, z^{(l)}) = \Sigma_{i=1}^{m} z_i^* \log(p_i) \tag{1}$$

with the softmax function $$p_i = \frac{e^{z_i^{(l)}}}{\sum_{j=1}^{m} e^{z_j^{(l)}}} \tag{2}$$

and probability $p=[p_i]$, target $z^*=[z_i^*]$ as well as computed $z^{(l)}=[z_i^{(l)}]$ at the output.

The forward propagation starts with an input x*. An affine function $\theta_k$ is applied followed by a component-wise application of a non-linear activation function $f_k$ to obtain an output of a layer. Propagation proceeds sequentially through a composition of layers k=1, ..., l defining the neural network ϕ. As a result, an output $z^{(l)}$ is computed at the final layer l, as shown below $$z^{(l)} = \phi(x^*) = f_l\{\theta_l(\ldots f_2[\theta_2(f_1(\theta_1(x^*)))])\} \quad (3)$$

For instance, assuming that $\theta_k(x) = W^{(k)}x + b^{(k)}$, $z^{(l)}$ may be written as $$z^{(l)} = f_l\{W^{(l)} \ldots f_2[W^{(2)}f_1(W^{(1)}x^* + b^{(1)}) + b^{(2)}] \ldots + b^{(l)}\} \quad (4)$$

where matrix of weights $W^{(k)} \in \mathbb{R}^{m \times n}$ and vector of bias $b(k) \in \mathbb{R}^m$, with dimensions m and n being consistent but potentially different across layers.

The backward propagation starts with an error $$\epsilon^T = \nabla \epsilon_l^T = \left[\frac{\partial \epsilon}{\partial z_1^{(l)}}, \ldots, \frac{\partial \epsilon}{\partial z_n^{(l)}}\right]$$

at the final layer. A chain rule is used $$\nabla \epsilon_{k-1} = J_{\theta_k}^T (\nabla \epsilon_k \cdot f'_k) \quad (5)$$

to find the corresponding error at the previous level, where $$J_{\theta_k} = \left[\frac{\partial y_i^{(k)}}{\partial z_j^{(k-1)}}\right]$$

is a Jacobian matrix, $f'_k = [f'(y_1^{(k)}), \ldots f'(y_m^{(k)})]^T$ and, $y^{(k)} = \theta_k(z^{(k-1)})$ while ∘ denotes the Hadamard (component-wise) product. Notice that $z^{(k-1)}$ denotes both the output of (k−1)-th and the input to k-th layer, with $z^{(k-1)} = x^*$. The backward propagation proceeds sequentially backwards through a composition of layers k=1, ..., l defining the neural network ϕ. As a result, the backward propagation computes errors $v^{(k)} = \nabla \epsilon_k \cdot f'_k$ at all layers, as shown below $$v^{(0)} = J_\phi^T \epsilon = J_{\theta_1}^T\{ \ldots f'_{l-2} \cdot (J_{\theta_{l-1}}^T [f'_{l-1} \cdot (J_{\theta_l}^T v^{(l)})])\} \quad (6)$$

where $J_\phi = [\partial_i/\partial \epsilon_j]$ is a Jacobian of the neural network. For instance, for the cross entropy error function in equation (1) can be written $$\nabla \epsilon_l = p - z^* \quad (7)$$

and for function $\theta_k$ in equation (4) the following can be used $$v^{(0)} = W^{(1)T}\{ \ldots f'_{l-2} \cdot (W^{(l-1)T}[f'_{l-1} \cdot (W^{(l)T}v^{(l)})])\} \quad (8)$$

The errors $v^{(k)}$ can then be used to update coefficients of functions $\theta_k$. In particular, in equation (4) these coefficients are the weights $W^{(k)}$ and bias $b^{(k)}$, where the following can be written $$\Delta W^{(k)} = \frac{\partial \epsilon}{\partial w^{(k)}} = (\nabla \epsilon_k \circ f'_k)\left(\frac{\partial y^{(k)}}{\partial w^{(k)}}\right) \quad (9)$$

$$\Delta b^{(k)} = \frac{\partial \epsilon}{\partial b^{(k)}} = (\nabla \epsilon_k \circ f'_k) \quad (10)$$

Finally, notice that in practice the data samples are often organized into mini-batches to take a better advantage of parallel computing platforms. A smaller mini-batch can often achieve higher test accuracy, while a larger mini-batch can attain higher performance. Therefore, the stochastic gradient descent and its variants, often average updates of the coefficients across the mini-batch, as shown below $$W_{new}^{(k)} = W^{(k)} - \frac{\alpha}{r}\Delta \overline{W}^{(k)} \quad (11)$$

$$\Delta \overline{W}^{(k)} = \sum_{i=1}^{r} W^{(k,i)} \quad (12)$$

where r is the mini-batch size and α is the learning rate.

Notice that the data samples inside a mini-batch are independent and can be processed in parallel, which is often referred to as data parallelism. On the other hand, the forward and backward propagation traversals through the layers are in principle sequential. Therefore, taking advantage of model parallelism, parallelism across layers, is more difficult. In the context of the following description, the fact that the forward and backward propagation can be interpreted as a solution of block bi-diagonal triangular systems of equations enables restructuring of a neural network to produce the parallel neural network system 100 as described further herein.

Let a neural network ϕ be defined by a composition of affine $\theta_k: \mathbb{R}^n \to \mathbb{R}^m$ and non-linear $f_k: \mathbb{R}\mathbb{R} \to \mathbb{R}$ functions that are applied component-wise on the output, for k=1, ..., l layers. Further, let the affine function be a sum $\theta_k = \lambda_k + b$ of linear function $\lambda_k: \mathbb{R}^n \to \mathbb{R}^m$ and a vector of constants $b \in \mathbb{R}^m$. Also, recall that $(y^k) = \theta_k(z^{(k-1)})$ where $z^{(k-1)}$ is the input to k-th layer, with $z^{(0)} = x^*$, and note that Jacobian $J_{\theta_k} = J_{\lambda_k}$.

The forward propagation of equation (3) can be written as the solution of the block bi-diagonal lower triangular system $\overline{L}\overline{z} = \overline{b}$, in the extended form below $$\begin{pmatrix} D^{(0)} & & & & \\ -\lambda^{(1)} & D^{(1)} & & & \\ & -\lambda^{(2)} & D^{(2)} & & \\ & & \ldots & \ldots & \\ & & & -\lambda^{(l)} & D^{(l)} \end{pmatrix} \begin{pmatrix} z^{(0)} \\ z^{(1)} \\ z^{(2)} \\ \ldots \\ z^{(l)} \end{pmatrix} = \begin{pmatrix} x^* \\ b^{(1)} \\ b^{(2)} \\ \ldots \\ b^{(l)} \end{pmatrix} \quad (13)$$

where $D^{(0)} = I$ and diagonal matrices $D^{(k)-1} = \text{diag}(f_k) \text{diag}(y_k)^{-1}$ for k=1, ..., l.

Similarly, the backward propagation equation (6) can be written as the solution of the block bi-diagonal upper triangular system $\overline{R}\overline{v} = \overline{c}$, in the extended form below $$\begin{pmatrix} E^{(0)} & -J_{\lambda_1}^T & & & \\ & E^{(1)} & -J_{\lambda_2}^T & \ldots & \\ & & \ldots & & \\ & & & E^{(l-1)} & -J_{\lambda_l}^T \\ & & & & E^{(l)} \end{pmatrix} \begin{pmatrix} v^{(0)} \\ v^{(1)} \\ \ldots \\ v^{(l-1)} \\ v^{(l)} \end{pmatrix} = \begin{pmatrix} 0 \\ 0 \\ \ldots \\ 0 \\ \epsilon \end{pmatrix} \quad (14)$$

where $\epsilon = \nabla \epsilon_l$, $E^{(0)} = I$ and diagonal matrices $E^{(k)-1} = \text{diag}(f'_k)$ for k=1, ..., l.

Notice that it might appear that equations (13) and (14) define two linear systems, which is contradictory to the non-linear nature of the forward and backward propagation process in neural networks. However, notice that in reality the non-linearity is implicitly hidden in the diagonal elements $D^{(k)}$ and $E^{(k)}$ of these systems. In fact, equations (13)

and (14) can be represented in this form only because the non-linear activation function is applied component-wise, and therefore if point $y_i^{(k)} \neq 0$, the function $f(y_i^{(k)})$ and its derivative $f'(y_i^{(k)})$ evaluations are known, then it is possible to find a scalars $\alpha = f(y_i^{(k)})/y_i^{(k)}$ and $\beta = f'(y_i^{(k)})$, such that the results can be obtained using a scaling with the constants $\alpha$ and $\beta$.

Notice that in forward propagation the points $y^{(k)}$ and $f_k$ are not known ahead of time. However, the points $y^{(k)}$ and $f_k$ can potentially be estimated from a previous pass over the data. The approximation can be effective in the later stages of training, when the training is close to the solution. Therefore, the forward propagation can be approximated by solving equation (13).

Notice that in backward propagation the starting points $y^{(k)}$ are in fact known and $f'(y^{(k)})$ can be pre-computed ahead of time. Therefore, backward propagation can be performed exactly by solving equation (14).

The developed theory described above handles arbitrary functions $\theta_k$ as well as most popular activation functions $f_k$. In particular, notice that when solving triangular systems represented using equations (13) and (14) with forward and backward substitution, respectively, multiplication is performed with $f(y)$ or $f'(y)$ diagonal terms, respectively. Therefore, the reformulation of backward propagation in equation (14) works independent of whether $f'(y) \neq 0$ or $f'(y) = 0$. The reformulation of forward propagation in equation (13) works with points $y \neq 0$ and $f(y) = 0$ for analogous reasons. Also, notice that when $y = 0$ and $f(y) = 0$ the desired effect can be achieved by simply setting diagonal element to unity. However, the reformulation of forward propagation in equation (13) does break down when $y = 0$ and $f(y) \neq 0$, because there is no constant that multiplied by zero produces a non-zero result. When using floating point numbers it is possible to be close to zero, but rarely exactly at the numerical zero, therefore the approach is likely to succeed in practice.

Model parallelism may be applied to feedforward neural networks. Assume a given data sample $(x^*, z^*)$, and a feedforward neural network $j$ defined by an affine function $\theta_k(x) = W^{(k)}x + b^{(k)}$ and an activation function $f_k$ for $k = 1, \ldots, l$ layers.

Let $\epsilon = \nabla \varepsilon_1$ be the error gradient at the output layer 1. Recall that the error $v^{(l)} = \epsilon \cdot f_l$ can be propagated through the neural network by repeated applications of the formula $$v^{(k-1)} = (W^{(k)T} v^{(k)}) \cdot f'(y^{(k-1)}) \tag{15}$$

for levels $k = 1, \ldots, 2$.

Notice that following equations (13) and (14), the forward propagation can be written as the solution of the bi-diagonal lower triangular system $\bar{L}\bar{z} = \bar{b}$, in the extended form below $$\begin{pmatrix} D^{(0)} & & & & \\ -W^{(1)} & D^{(1)} & & & \\ & -W^{(2)} & D^{(2)} & & \\ & & \ldots & \ldots & \\ & & & -W^{(l)} & D^{(l)} \end{pmatrix} \begin{pmatrix} z^{(0)} \\ z^{(1)} \\ z^{(2)} \\ \ldots \\ z^{(l)} \end{pmatrix} = \begin{pmatrix} x^* \\ b^{(1)} \\ b^{(2)} \\ \ldots \\ b^{(l)} \end{pmatrix} \tag{16}$$

while backward propagation as the solution of the block bi-diagonal upper triangular system $\bar{R}\bar{v} = \bar{c}$, is written in the extended form below $$\begin{pmatrix} E^{(0)} & -W^{(1)T} & & & \\ & E^{(1)} & -W^{(2)T} & & \\ & & \ldots & \ldots & \\ & & & E^{(l-1)} & -W^{(l)T} \\ & & & & E^{(l)} \end{pmatrix} \begin{pmatrix} v^{(0)} \\ v^{(1)} \\ \ldots \\ v^{(l-1)} \\ v^{(l)} \end{pmatrix} = \begin{pmatrix} 0 \\ 0 \\ \ldots \\ 0 \\ \epsilon \end{pmatrix} \tag{17}$$

where $D^{(0)} = E^{(0)} = I$ and diagonal matrices $D^{(k)} = [d_{ii}^{(k)}]$ and $E^{(k)}[e_{ii}^{(k)}]$ have elements $$d_{ii}^{(k)} = \frac{y_i^{(k)}}{f(y_i^{(k)})} \tag{18}$$

and $$e_{ii}^{(k)} = \frac{1}{f'(y_i^{(k)})}, \tag{19}$$

respectively, for $k = 1, \ldots, l$.

Model parallelism may also be applied to recurrent neural networks. Assume a given sequence $(x^{(*,s)}, z^{(*,s)})$, and a recurrent neural network $\phi$ defined by an affine function $\theta_k(X^{(k,s)}) = W^{(k)}x^{(k-1,s)} + U^{(k)}X^{(k,s-1)}b^{(k)}$ and an activation function $f_k$ for $k = 1, \ldots, l$ layers and $s = 1, \ldots, t$ time steps.

Let $\epsilon^{(s)} = \nabla \epsilon_{l,s}$ be the error gradient at the output layer 1 at time step s. Recall that the error $v^{(l,s)} = \epsilon^{(s)} \cdot f_{l,s}$ can be back-propagated through the neural network by repeated applications of the formula $$v^{(k-1,s)} = (W^{(k)T} v^{(k,s)} + U^{(k-1)T} v^{(k-1,s+1)}) \cdot f'(y^{(k-1,s)}) \tag{20}$$

for levels $k = 1, \ldots, 2$ and time steps $s = \tau, \ldots, 1$ where the terms for time $s+1 > \tau$ are considered to be zero.

Notice that following equations (13) and (14), the forward propagation can be written as the solution of the bi-diagonal lower triangular system $\tilde{L}\tilde{z} = \tilde{b}$, in the extended form below $$\begin{pmatrix} \bar{L}^{(1)} & & & & \\ -\bar{U}^{(2)} & \bar{L}^{(2)} & & & \\ & -\bar{U}^{(3)} & \bar{L}^{(3)} & & \\ & & \ldots & \ldots & \\ & & & -\bar{U}^{(\tau)} & \bar{L}^{(\tau)} \end{pmatrix} \begin{pmatrix} \bar{z}^{(1)} \\ \bar{z}^{(2)} \\ \bar{z}^{(3)} \\ \ldots \\ \bar{z}^{(\tau)} \end{pmatrix} = \begin{pmatrix} \bar{b}^{(1)} \\ \bar{b}^{(2)} \\ \bar{b}^{(3)} \\ \ldots \\ \bar{b}^{(\tau)} \end{pmatrix} \tag{21}$$

while backward propagation as the solution of the block bi-diagonal upper triangular system $\tilde{R}\tilde{v} = \tilde{c}$, is written in the extended form below $$\begin{pmatrix} \bar{R}^{(1)} & -\bar{U}^{(2)T} & & & \\ & \bar{R}^{(2)} & -\bar{U}^{(3)T} & & \\ & & \ldots & \ldots & \\ & & & \bar{R}^{(\tau-1)} & -\bar{U}^{(\tau)T} \\ & & & & \bar{R}^{(\tau)} \end{pmatrix} \begin{pmatrix} \bar{v}^{(1)} \\ \bar{v}^{(2)} \\ \ldots \\ \bar{v}^{(\tau-1)} \\ \bar{v}^{(\tau)} \end{pmatrix} = \begin{pmatrix} \bar{c}^{(1)} \\ \bar{c}^{(2)} \\ \ldots \\ \bar{c}^{(\tau-1)} \\ \bar{c}^{(\tau)} \end{pmatrix} \tag{22}$$

where

-continued $$\overline{L}^{(s)} = \begin{pmatrix} D^{(0,s)} & & & & \\ -W^{(1)} & D^{(1,s)} & & & \\ & -W^{(2)} & D^{(2,s)} & & \\ & & \ldots & \ldots & \\ & & & -W^{(l)} & D^{(l,s)} \end{pmatrix}, \quad (23)$$

$$\overline{z}^{(s)} = \begin{pmatrix} z^{(0,s)} \\ z^{(1,s)} \\ z^{(2,s)} \\ \ldots \\ z^{(l,s)} \end{pmatrix} \text{ and } \overline{b}^{(s)} = \begin{pmatrix} x^{(*,s)} \\ b^{(1)} \\ b^{(2)} \\ \ldots \\ b^{(l)} \end{pmatrix}$$

$$\overline{R}^{(s)} = \begin{pmatrix} E^{(0,s)} & -W^{(1)T} & & & \\ & E^{(1,s)} & -W^{(2)(T)} & & \\ & & \ldots & \ldots & \\ & & & E^{(l-1,s)} & -W^{(l)T} \\ & & & & E^{(l,s)} \end{pmatrix}, \quad (24)$$

$$\overline{v}^{(s)} = \begin{pmatrix} v^{(0,s)} \\ v^{(1,s)} \\ \ldots \\ v^{(l-1,s)} \\ v^{(l,s)} \end{pmatrix} \text{ and } \overline{c}^{(s)} = \begin{pmatrix} 0 \\ 0 \\ \ldots \\ 0 \\ \epsilon^{(s)} \end{pmatrix}$$

with $D^{(0,s)} = E^{(0,s)} = I$ and diagonal matrices $D^{(k,s)} = [d_{ii}^{(k,s)}]$ and $E^{(k,s)} = [e_{ii}^{(k,s)}]$ have elements $$d_{ii}^{(k,s)} = \frac{y_i^{(k,s)}}{f(y_i^{(k,s)})} \quad (25)$$

and $$e_{ii}^{(k,s)} = \frac{1}{f'(y_i^{(k,s)})}, \quad (26)$$

respectively, for $k=2, \ldots, l$. Finally, letting $U^{(0)}=0$, $\overline{U}^{(s)}$ may be written $$\overline{U}^{(s)} = \begin{pmatrix} U^{(0)} & & & & \\ & U^{(1)} & & & \\ & & U^{(2)} & & \\ & & & \ldots & \\ & & & & U^{(l)} \end{pmatrix} \quad (27)$$

that, in fact, does not depend on time steps s.

Notice that the systems of equations (21) and (22) are block bi-diagonal, with the diagonal blocks $\overline{L}^{(s)}$ and $\overline{R}^{(s)}$ given in equations (23) and (24), respectively. Further, notice that $\overline{L}^{(s)}$ and $\overline{R}^{(s)}$ are themselves block bi-diagonal systems. In fact, $\overline{L}^{(s)}$ and $\overline{R}^{(s)}$ correspond to equations (16) and (17) for a particular time step s.

There is a number of algorithms in numerical linear algebra that have been developed to solve block bi-diagonal triangular systems. For example, the parallel solution of the system of equations (16) and (17) can be illustrated using a variant of cyclic reduction. For clarity, assume that a neural network has an odd number of levels l>1. The handling of the case for a neural network having an even number of layers is similar.

Notice that using scaling S and permutation P matrices, an equivalent system $(S\overline{L}P)(P^T\overline{z}) = S\overline{b}$ to equation (16) may be written in block bi-diagonal lower triangular form as $$\left( \begin{array}{cccc|cccc} D^{(1)} & & & & & & & \\ -B^{(3)} & D^{(3)} & & & & & & \\ & \ldots & \ldots & & & & & \\ & & -B^{(l)} & D^{(l)} & & & & \\ \hline & & & & D^{(0)} & & & \\ & & & & -B^{(2)} & D^{(2)} & & \\ & & & & & \ldots & \ldots & \\ & & & & & & -B^{(l-1)} & D^{(l-1)} \end{array} \right) \begin{pmatrix} z^{(1)} \\ z^{(3)} \\ \ldots \\ z^{(l)} \\ \hline x^* \\ z^{(2)} \\ \ldots \\ z^{(l-1)} \end{pmatrix} = \begin{pmatrix} g^{(1)} \\ g^{(3)} \\ \ldots \\ g^{(l)} \\ \hline x^* \\ g^{(2)} \\ \ldots \\ g^{(l-1)} \end{pmatrix} \quad (28)$$

where off-diagonal blocks $B^{(k)} = W^{(k)} D^{(k-1)-1} W^{(k-1)}$, right-hand-side $g^{(0)} = x^*$, $g^{(1)} = W^{(1)} x^* + b^{(1)}$ and $g^{(k)} = W^{(k)} D^{(k-1)-1} b^{(k-1)} + b^{(k)}$ for $k=2, \ldots, l$. The scaling matrix S is defined as $$S = \begin{pmatrix} W^{(1)}D^{(0)^{-1}} & I & & & & & & \\ & & W^{(3)}D^{(2)^{-1}} & I & & & & \\ & & & & \ldots & \ldots & & \\ & & & & & & W^{(l)}D^{(l-1)^{-1}} & I \\ I & & & & & & & \\ 0 & W^{(2)}D^{(1)^{-1}} & I & & & & & \\ & & & \ldots & \ldots & & & \\ & & & & & W^{(l)}D^{(l-1)^{-1}} & I & 0 \end{pmatrix}$$

and the scaling matrix T is defined as $$T = \begin{pmatrix} I & W^{(1)^T}E^{(1)^{-1}} & & & & & & \\ & I & W^{(3)^T}E^{(3)^{-1}} & & & & & \\ & & \ldots & \ldots & & & & \\ & & & & I & W^{(l)^T}E^{(l)^{-1}} & & \\ 0 & I & W^{(2)^T}E^{(2)^{-1}} & & & & & \\ & & \ldots & \ldots & & & & \\ & & & I & W^{(l-1)^T}E^{(l-1)^{-1}} & & & \\ & & & & I & & & \end{pmatrix}$$

and the permutation matrices $P^T$ and $Q^T$ that rearrange odd and even variables are defined as $$P^T = \begin{pmatrix} 0 & I & & & & & & \\ & & 0 & I & & & & \\ & & & & \ldots & \ldots & & \\ & & & & & & 0 & I \\ I & 0 & & & & & & \\ & & I & 0 & & & & \\ & & & & \ldots & \ldots & & \\ & & & & & & I & 0 \end{pmatrix}$$

and $$Q^T = \begin{pmatrix} I & 0 & & & & & & \\ & & I & 0 & & & & \\ & & & & \ldots & \ldots & & \\ & & & & & & I & 0 \\ 0 & I & & & & & & \\ & & 0 & I & & & & \\ & & & & \ldots & \ldots & & \\ & & & & & & 0 & I \end{pmatrix}$$

Also, using scaling T and permutation Q matrices, an equivalent system $(\overline{TRQ})(Q^T\overline{v})=\overline{Tc}$ to equation (17) may be written in block bi-diagonal upper triangular form as $$\begin{pmatrix} E^{(0)} & -C^{(2)^T} & & & & & & \\ & \ldots & \ldots & & & & & \\ & & E^{(l-3)} & -C^{(l-1)^T} & & & & \\ & & & E^{(l-1)} & & & & \\ \hline & & & & E^{(1)} & -C^{(3)^T} & & \\ & & & & & \ldots & \ldots & \\ & & & & & & E^{(l-2)} & -C^{(l)^T} \\ & & & & & & & E^{(l)} \end{pmatrix} \begin{pmatrix} v^{(0)} \\ \ldots \\ v^{(l-3)} \\ v^{(l-1)} \\ \hline v^{(1)} \\ \ldots \\ v^{(l-2)} \\ v^{(l)} \end{pmatrix} = \begin{pmatrix} 0 \\ \ldots \\ 0 \\ h^{(l-1)} \\ \hline 0 \\ \ldots \\ 0 \\ h^{(l)} \end{pmatrix} \quad (29)$$

where off-diagonal blocks $C^{(k)^T}=W^{(k-1)^T}E^{(k-1)^{-1}}W^{(k)^T}$, right-hand-side $h^{(l)}=\epsilon$, $h^{(l-1)}=W^{(l)^T}E^{(l)^{-1}}$ and $h^{(k-2)}=c^{(k-2)}+W^{(k-1)^T}E^{(k-1)^{-1}}c^{(k-1)}=0$ for k=2, ..., l.

Notice that both equations (28) and (29) decouple into two independent smaller systems of half the size of the original. In one embodiment, the two independent smaller systems comprise the even neural network model 130 and the odd neural network model 120. Since the approach can be applied recursively, approximate forward and exact backward propagation may be performed in parallel in O(log l) steps. Notice that based on equivalence of the original linear systems in equations (16) and (28), the forward propagation in equation (4) is equivalent to two independent forward propagations $$z^{(l)}=f_l\{B^{(l)} \ldots f_5[B^{(5)}f_3(B^{(3)}g^{(1)}+g^{(3)})+g^{(5)}]+g^{(l)})\} \quad (30)$$

$$z^{(l-1)}=f_{l-1}\{B^{(l-1)} \ldots f_4[B^{(4)}f_2(B^{(2)}g^{(0)}+g^{(2)})+g^{(4)}]+g^{(l-1)}\} \quad (31)$$

with modified weights $B^{(k)}$ for k=2, . . . , l and inputs $g^{(0)}$ $g^{(1)}$ at the initial layer.

Also, based on equivalence of original linear system in equations (17) and (29), the backward propagation in equation (8) is equivalent to two independent backward propagations $$v^{(0)}=C^{(2)^T}\{ \ldots f_{l-5}\cdot(C^{(l-3)^T}[f_{l-3}\cdot(C^{(l-1)^T}v^{(l-1)})])\} \quad (32)$$

$$v^{(1)}=C^{(3)^T}\{ \ldots f_{l-4}\cdot(C^{(l-2)^T}[f_{l-2}\cdot(C^{(l)^T}v^{(l)})])\} \quad (33)$$

with modified weights $C^{(k)}$ for k=2, . . . , l and errors $h^{(l)}$ and $h^{(l-1)}$ at the final layer.

The solution of systems of the equations (21) and (22) is very similar, with the exception that each diagonal block $\overline{L}(s)$ in equation (23) and $\overline{R}(s)$ in equation (24) is itself a block bi-diagonal system. Therefore, the systems of equations (21) and (22) can be solved in parallel in O((log k)(log τ)) steps.

Finally, notice that in neural networks a training dataset is often divided into mini batches, and therefore, a set of shifted systems needs to be solved to extract additional data parallelism. Notice that the only difference between the systems are the diagonal blocks $D^{(k)}$ and $E^{(k)}$, which are based on a particular data sample, while off diagonal blocks $B^{(k)}$ and $C^{(k)}$ remain the same. Therefore, the generalization of our approach to a set of diagonally modified systems might be feasible.

Figure 2:
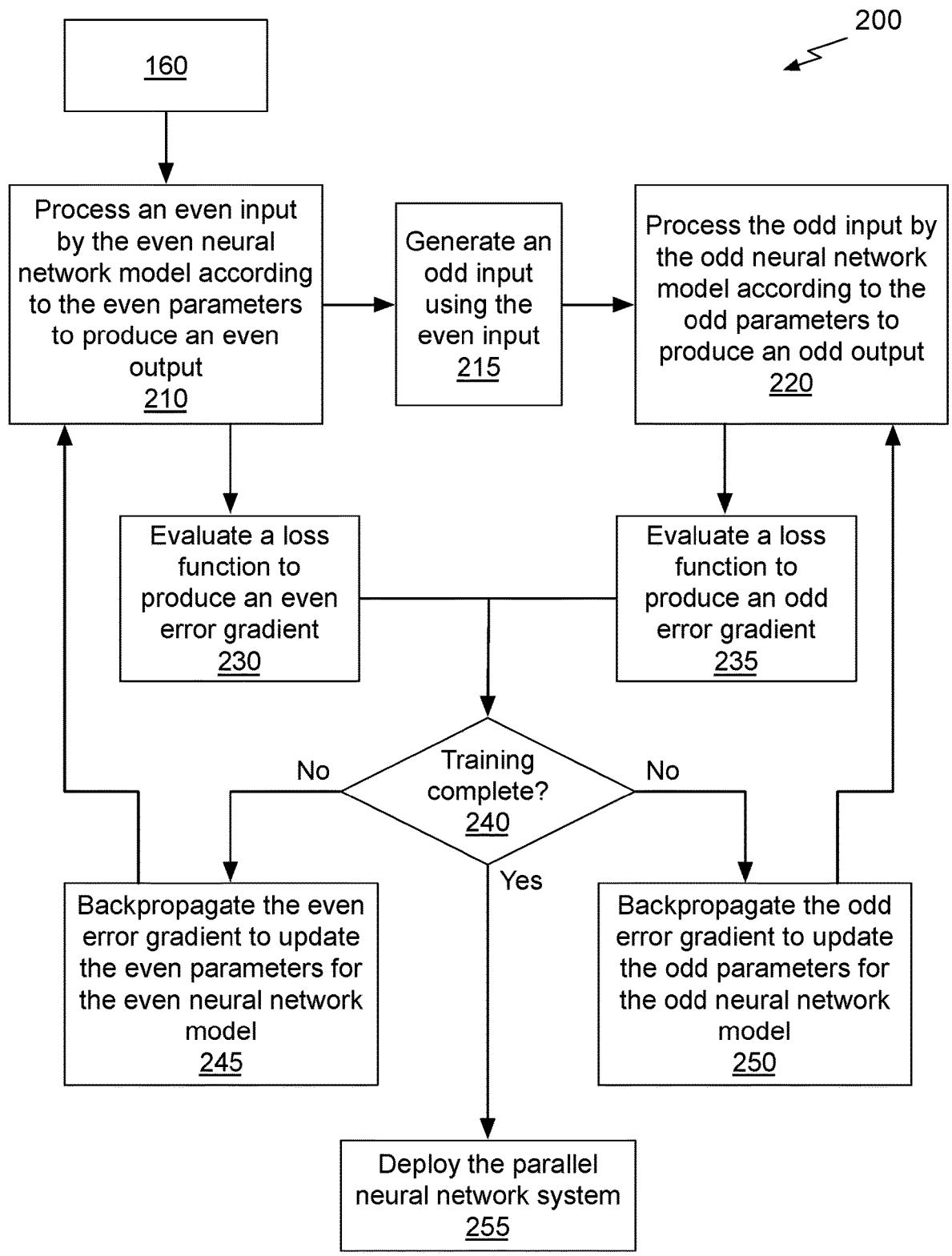
FIG. 2 illustrates another flowchart of a method for training a parallel neural network, in accordance with an embodiment.

FIG. 2 illustrates another flowchart of a method 200 for training a parallel neural network, in accordance with an embodiment. Although method 200 is described in the context of a processing unit, the method 200 may also be performed by a program, custom circuitry, or by a combination of custom circuitry and a program. For example, the method 200 may be executed by a GPU (graphics processing unit), CPU (central processing unit), or any processor capable of implementing a neural network model. Furthermore, persons of ordinary skill in the art will understand that any system that performs method 200 is within the scope and spirit of embodiments of the present disclosure.

At step 160, the neural network model 110 including multiple processing layers, alternating between odd and even processing layers, is restructured into the even neural network model 130 including only the even processing layers and the odd neural network model 120 including only the odd processing layers. The odd neural network model 120 and the even neural network model 130 comprise the parallel neural networks. In an embodiment, the odd neural network model 120 is restructured, separating alternating layers into a first even neural network model including only the even processing layers from the odd neural network model 120 and a second even neural network model including only the odd processing layers from the odd neural network model 120. In an embodiment, the even neural network model 130 is restructured, separating alternating layers into a first even neural network model including only the even processing layers from the even neural network model 130 and a second even neural network model including only the odd processing layers from the even neural network model 130. Each successive parallel neural network model may be restructured, increasing parallelism.

At step 210, an input is processed by the even neural network model 130 according to the even parameters to produce an even output. In an embodiment, the even and odd parameters are weights. In an embodiment, the parameters for each layer 1 during forward propagation are the modified weights $B^{(k)}$. In an embodiment, the modified weights are approximated for forward propagation pass.

At step 215, an odd input is generated by the odd input generation unit 135 using the even input. In one embodiment, the even input $g^{(0)}=x^*$ and the odd input is generated as $g^{(1)}=W^{(1)}x^*+b^{(1)}$, where $x^*$ is the input to the neural network model 110 before being split into the odd neural network model 120 and the even neural network model 130. At step 220, the odd input is processed by the odd neural network model 120 according to the odd parameters to produce an odd output.

Steps 210 and 220 may be performed in parallel. In an embodiment, the odd input data is processed by the odd neural network model 120 according to the updated odd parameter values simultaneously with processing of the even input data by the even neural network model 130 according to the updated even parameter values to produce intermediate odd data and intermediate even data at each layer and the odd and even outputs at the last layers. In contrast, when the input is processed by the neural network model 110, the parallel processing across layers is not possible. Therefore, the processing performance is increased, possibly doubled, for the parallel neural network system 100 compared with the neural network model 110. In an embodiment, the even and odd outputs are computed by the even neural network model 130 and the odd neural network model 120 according to equations (31) and (30), respectively. In an embodiment, the intermediate odd data and the intermediate even data output by each layer of the parallel neural network system 100 approximate intermediate data computed by the neural network model 110 including the multiple processing layers.

At step 230, the loss function 125 evaluates the even output to produce an even error gradient. In an embodiment, the loss function 125 receives an even ground truth output associated with the input and the gradient is computed based on the difference between the even ground truth output ($z^*$) and the even output. In an embodiment, the even error gradient is the error $h^{(l)}$. At step 235, the loss function 125 evaluates the odd output to produce an odd error gradient. In an embodiment, the loss function 125 receives an odd ground truth output associated with the odd input and the gradient is computed based on the difference between the odd ground truth output and the odd output. In an embodiment, the odd error gradient is the error $h^{(l-1)}$. Steps 230 and 235 may be performed in parallel.

At step 245, the even error gradient is backpropagated through each layer of the even neural network model 130 to update the even parameters. Note that during backpropagation each layer processes the error gradient in the reverse order compared with the order in which the input is processed during forward propagation. At step 250, the odd error gradient is backpropagated through each layer of the odd neural network model 120 to update the odd parameters.

At step 240, a determination is made whether training of the parallel neural network system 100 is complete. In an embodiment, training is complete when the error gradients are below a threshold value. When training is not complete, the method 200 continues to steps 245 and 250. Otherwise, when training is complete, at step 255 the parallel neural network system 100 may be deployed.

Steps 245 and 250 may be performed in parallel. In an embodiment, the odd error gradient and the even error gradient are simultaneously back propagated through the odd neural network model 120 to update odd parameter values and through the even neural network model 130 to update even parameter values, respectively. In contrast, when the output is backpropagated through the neural network model 110, parallel processing across layers is not possible. Therefore, the processing performance is increased, possibly doubled, for the parallel neural network system 100 compared with the neural network model 110.

In an embodiment, the error gradients are computed by the even neural network model 130 and the odd neural network model 120 according to equations (33) and (32), respectively. In an embodiment, the parameters for each layer 1 during backward propagation are the modified weights $C^{(k)}$. After steps 245 and 250 are completed, training of the parallel neural network system 100 continues at steps 210 and 220 and a new input is received.

In sum, forward and backward propagation through a neural network model may be represented as solution of triangular systems. The representation enables restructuring of the neural network model 110 using parallel schemes for forward and backward propagation. In particular, a variation of cyclic reduction may be applied to parallelize the propagation process.

Parallel Processing Architecture

Figure 3:
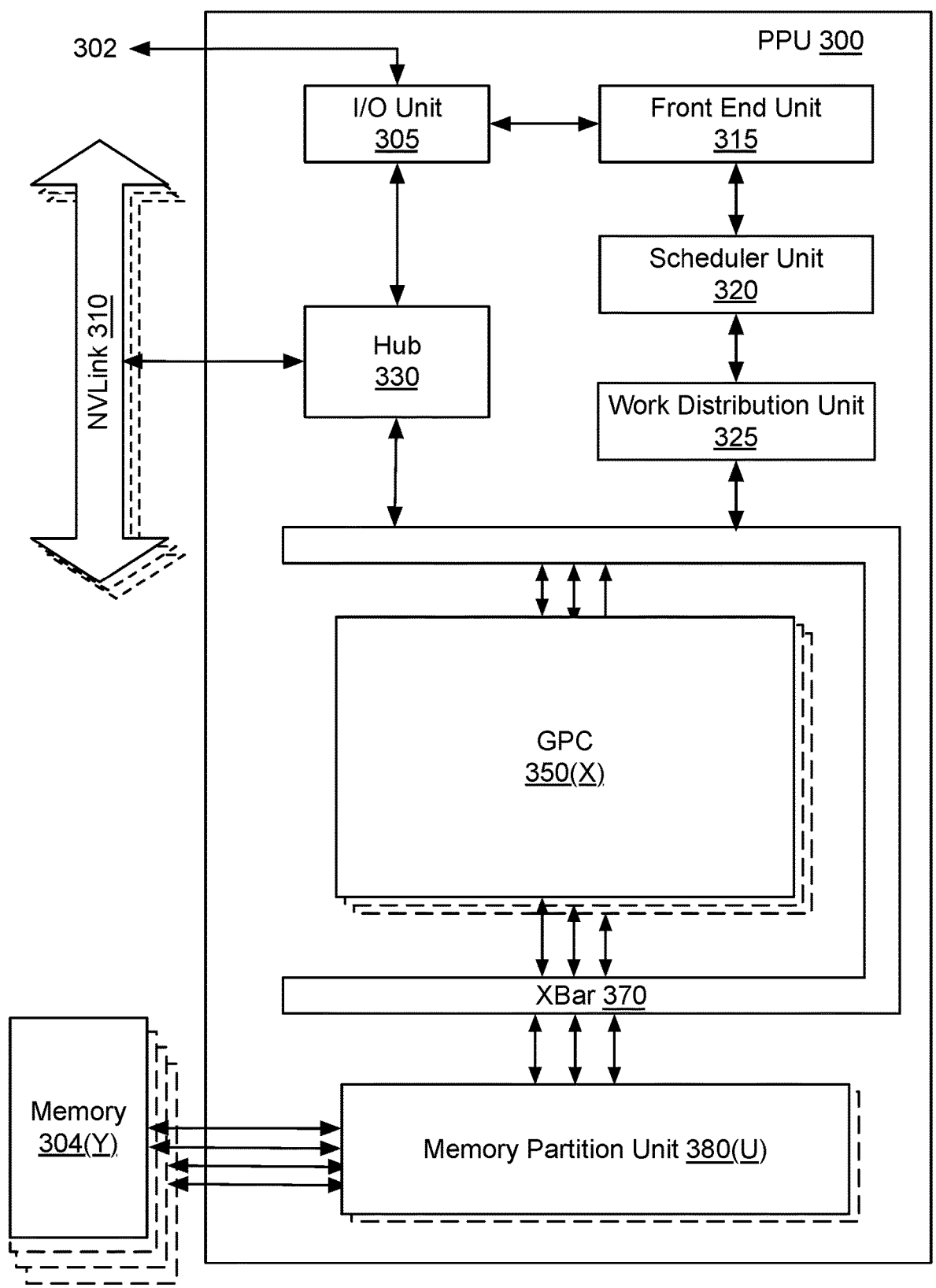
FIG. 3 illustrates a parallel processing unit, in accordance with an embodiment.

FIG. 3 illustrates a parallel processing unit (PPU) 300, in accordance with an embodiment. In an embodiment, the PPU 300 is a multi-threaded processor that is implemented on one or more integrated circuit devices. The PPU 300 is a latency hiding architecture designed to process many threads in parallel. A thread (e.g., a thread of execution) is an instantiation of a set of instructions configured to be executed by the PPU 300. In an embodiment, the PPU 300 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 300 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 300 may be configured to accelerate thousands of High Performance Computing (HPC), data center, and machine learning applications. The PPU 300 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 3, the PPU 300 includes an Input/Output (I/O) unit 305, a front end unit 315, a scheduler unit 320, a work distribution unit 325, a hub 330, a crossbar (Xbar) 370, one or more general processing clusters (GPCs) 350, and one or more memory partition units 380. The PPU 300 may be connected to a host processor or other PPUs 300 via one or more high-speed NVLink 310 interconnect. The PPU 300 may be connected to a host processor or other peripheral devices via an interconnect 302. The PPU 300 may also be connected to a local memory comprising a number of memory devices 304. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 310 interconnect enables systems to scale and include one or more PPUs 300 combined with one or more CPUs, supports cache coherence between the PPUs 300 and CPUs, and CPU mastering. Data and/or commands may be transmitted by the NVLink 310 through the hub 330 to/from other units of the PPU 300 such as one or more copy engines, a video encoder, a video decoder, a power management unit, etc. (not explicitly shown). The NVLink 310 is described in more detail in conjunction with FIG. 5B.

The I/O unit 305 is configured to transmit and receive communications (e.g., commands, data, etc.) from a host processor (not shown) over the interconnect 302. The I/O unit 305 may communicate with the host processor directly via the interconnect 302 or through one or more intermediate devices such as a memory bridge. In an embodiment, the I/O unit 305 may communicate with one or more other processors, such as one or more the PPUs 300 via the interconnect 302. In an embodiment, the I/O unit 305 implements a Peripheral Component Interconnect Express (PCIe) interface for communications over a PCIe bus and the interconnect 302 is a PCIe bus. In alternative embodiments, the I/O unit 305 may implement other types of well-known interfaces for communicating with external devices.

The I/O unit 305 decodes packets received via the interconnect 302. In an embodiment, the packets represent commands configured to cause the PPU 300 to perform various operations. The I/O unit 305 transmits the decoded commands to various other units of the PPU 300 as the commands may specify. For example, some commands may be transmitted to the front end unit 315. Other commands may be transmitted to the hub 330 or other units of the PPU 300 such as one or more copy engines, a video encoder, a video decoder, a power management unit, etc. (not explicitly shown). In other words, the I/O unit 305 is configured to route communications between and among the various logical units of the PPU 300.

In an embodiment, a program executed by the host processor encodes a command stream in a buffer that provides workloads to the PPU 300 for processing. A workload may comprise several instructions and data to be processed by those instructions. The buffer is a region in a memory that is accessible (e.g., read/write) by both the host processor and the PPU 300. For example, the I/O unit 305 may be configured to access the buffer in a system memory connected to the interconnect 302 via memory requests transmitted over the interconnect 302. In an embodiment, the host processor writes the command stream to the buffer and then transmits a pointer to the start of the command stream to the PPU 300. The front end unit 315 receives pointers to one or more command streams. The front end unit 315 manages the one or more streams, reading commands from the streams and forwarding commands to the various units of the PPU 300.

The front end unit 315 is coupled to a scheduler unit 320 that configures the various GPCs 350 to process tasks defined by the one or more streams. The scheduler unit 320 is configured to track state information related to the various tasks managed by the scheduler unit 320. The state may indicate which GPC 350 a task is assigned to, whether the task is active or inactive, a priority level associated with the task, and so forth. The scheduler unit 320 manages the execution of a plurality of tasks on the one or more GPCs 350.

The scheduler unit 320 is coupled to a work distribution unit 325 that is configured to dispatch tasks for execution on the GPCs 350. The work distribution unit 325 may track a number of scheduled tasks received from the scheduler unit 320. In an embodiment, the work distribution unit 325 manages a pending task pool and an active task pool for each of the GPCs 350. The pending task pool may comprise a number of slots (e.g., 32 slots) that contain tasks assigned to be processed by a particular GPC 350. The active task pool may comprise a number of slots (e.g., 4 slots) for tasks that are actively being processed by the GPCs 350. As a GPC 350 finishes the execution of a task, that task is evicted from the active task pool for the GPC 350 and one of the other tasks from the pending task pool is selected and scheduled for execution on the GPC 350. If an active task has been idle on the GPC 350, such as while waiting for a data dependency to be resolved, then the active task may be evicted from the GPC 350 and returned to the pending task pool while another task in the pending task pool is selected and scheduled for execution on the GPC 350.

The work distribution unit 325 communicates with the one or more GPCs 350 via XBar 370. The XBar 370 is an interconnect network that couples many of the units of the PPU 300 to other units of the PPU 300. For example, the XBar 370 may be configured to couple the work distribution unit 325 to a particular GPC 350. Although not shown explicitly, one or more other units of the PPU 300 may also be connected to the XBar 370 via the hub 330.

The tasks are managed by the scheduler unit 320 and dispatched to a GPC 350 by the work distribution unit 325. The GPC 350 is configured to process the task and generate results. The results may be consumed by other tasks within the GPC 350, routed to a different GPC 350 via the XBar 370, or stored in the memory 304. The results can be written to the memory 304 via the memory partition units 380, which implement a memory interface for reading and writing data to/from the memory 304. The results can be transmitted to another PPU 304 or CPU via the NVLink 310. In an embodiment, the PPU 300 includes a number U of memory partition units 380 that is equal to the number of separate and distinct memory devices 304 coupled to the PPU 300. A memory partition unit 380 will be described in more detail below in conjunction with FIG. 4B.

In an embodiment, a host processor executes a driver kernel that implements an application programming interface (API) that enables one or more applications executing on the host processor to schedule operations for execution on the PPU 300. In an embodiment, multiple compute applications are simultaneously executed by the PPU 300 and the PPU 300 provides isolation, quality of service (QoS), and independent address spaces for the multiple compute applications. An application may generate instructions (e.g., API calls) that cause the driver kernel to generate one or more tasks for execution by the PPU 300. The driver kernel outputs tasks to one or more streams being processed by the PPU 300. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 5A.

Figure 4A:
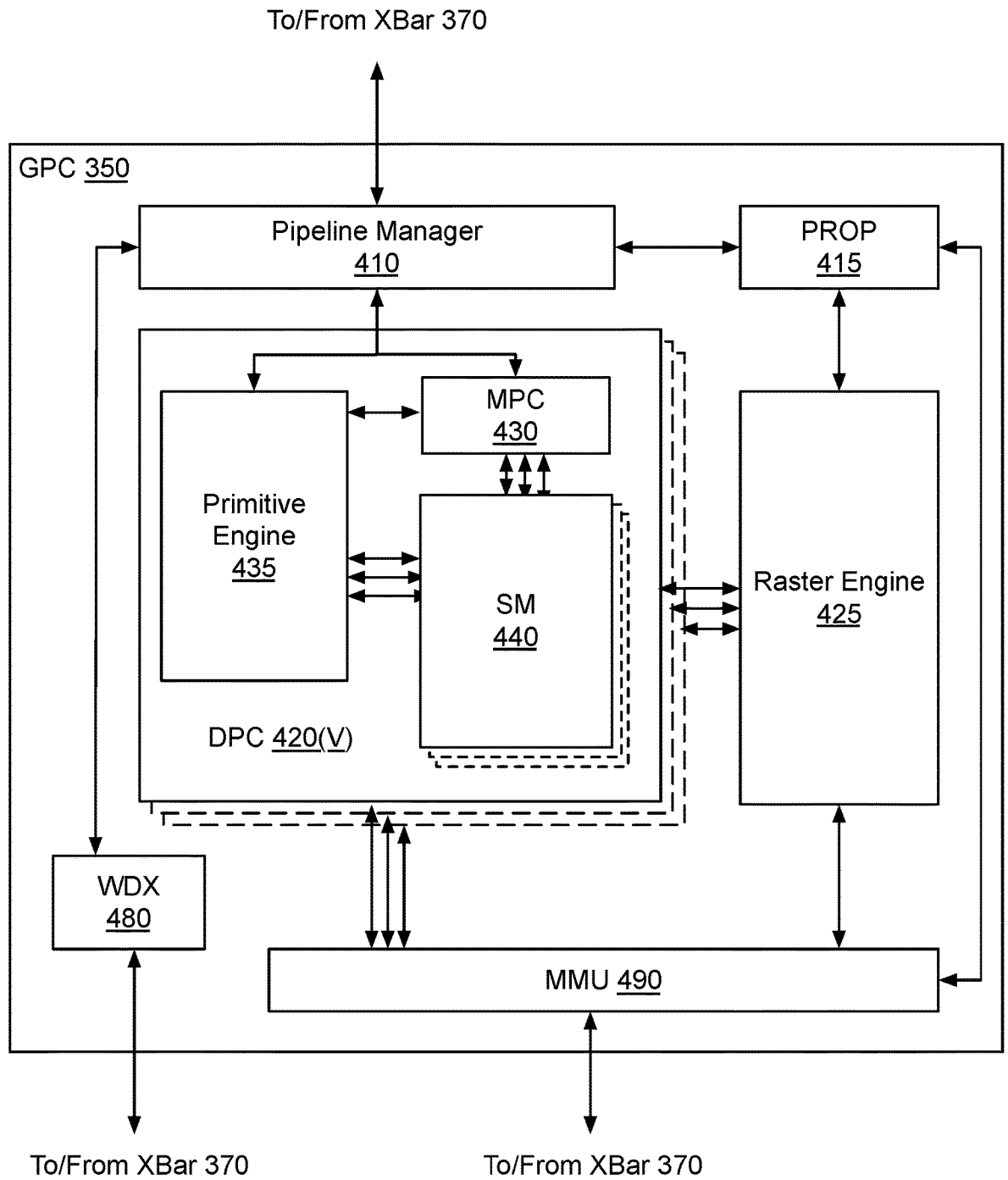
FIG. 4A illustrates a general processing cluster within the parallel processing unit of FIG. 3, in accordance with an embodiment.

FIG. 4A illustrates a GPC 350 of the PPU 300 of FIG. 3, in accordance with an embodiment. As shown in FIG. 4A, each GPC 350 includes a number of hardware units for processing tasks. In an embodiment, each GPC 350 includes a pipeline manager 410, a pre-raster operations unit (PROP) 415, a raster engine 425, a work distribution crossbar (WDX) 480, a memory management unit (MMU) 490, and one or more Data Processing Clusters (DPCs) 420. It will be appreciated that the GPC 350 of FIG. 4A may include other hardware units in lieu of or in addition to the units shown in FIG. 4A.

In an embodiment, the operation of the GPC 350 is controlled by the pipeline manager 410. The pipeline manager 410 manages the configuration of the one or more DPCs 420 for processing tasks allocated to the GPC 350. In an embodiment, the pipeline manager 410 may configure at least one of the one or more DPCs 420 to implement at least a portion of a graphics rendering pipeline. For example, a DPC 420 may be configured to execute a vertex shader program on the programmable streaming multiprocessor (SM) 440. The pipeline manager 410 may also be configured to route packets received from the work distribution unit 325 to the appropriate logical units within the GPC 350. For example, some packets may be routed to fixed function hardware units in the PROP 415 and/or raster engine 425 while other packets may be routed to the DPCs 420 for processing by the primitive engine 435 or the SM 440. In an embodiment, the pipeline manager 410 may configure at least one of the one or more DPCs 420 to implement a neural network model and/or a computing pipeline.

Figure 4B:
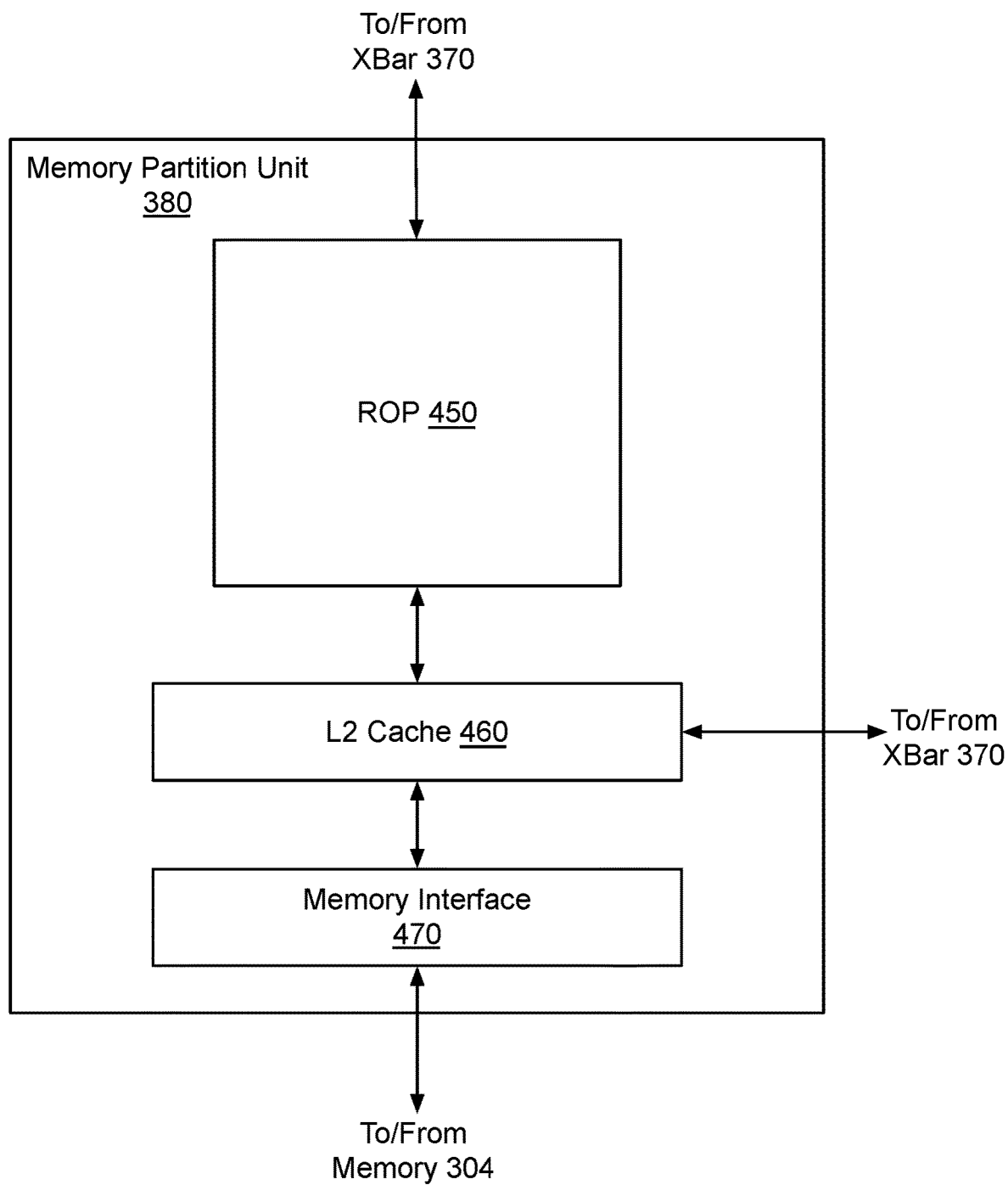
FIG. 4B illustrates a memory partition unit of the parallel processing unit of FIG. 3, in accordance with an embodiment.

The PROP unit 415 is configured to route data generated by the raster engine 425 and the DPCs 420 to a Raster Operations (ROP) unit, described in more detail in conjunction with FIG. 4B. The PROP unit 415 may also be configured to perform optimizations for color blending, organize pixel data, perform address translations, and the like.

The raster engine 425 includes a number of fixed function hardware units configured to perform various raster operations. In an embodiment, the raster engine 425 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x, y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 425 comprises fragments to be processed, for example, by a fragment shader implemented within a DPC 420.

Each DPC 420 included in the GPC 350 includes an M-Pipe Controller (MPC) 430, a primitive engine 435, and one or more SMs 440. The MPC 430 controls the operation of the DPC 420, routing packets received from the pipeline manager 410 to the appropriate units in the DPC 420. For example, packets associated with a vertex may be routed to the primitive engine 435, which is configured to fetch vertex attributes associated with the vertex from the memory 304. In contrast, packets associated with a shader program may be transmitted to the SM 440.

The SM 440 comprises a programmable streaming processor that is configured to process tasks represented by a number of threads. Each SM 440 is multi-threaded and configured to execute a plurality of threads (e.g., 32 threads) from a particular group of threads concurrently. In an embodiment, the SM 440 implements a SIMD (Single-Instruction, Multiple-Data) architecture where each thread in a group of threads (e.g., a warp) is configured to process a different set of data based on the same set of instructions. All threads in the group of threads execute the same instructions. In another embodiment, the SM 440 implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The SM 440 will be described in more detail below in conjunction with FIG. 5A.

The MMU 490 provides an interface between the GPC 350 and the memory partition unit 380. The MMU 490 may provide translation of virtual addresses into physical addresses, memory protection, and arbitration of memory requests. In an embodiment, the MMU 490 provides one or more translation lookaside buffers (TLBs) for performing translation of virtual addresses into physical addresses in the memory 304.

FIG. 4B illustrates a memory partition unit 380 of the PPU 300 of FIG. 3, in accordance with an embodiment. As shown in FIG. 4B, the memory partition unit 380 includes a Raster Operations (ROP) unit 450, a level two (L2) cache 460, and a memory interface 470. The memory interface 470 is coupled to the memory 304. Memory interface 470 may implement 32, 64, 128, 1024-bit data buses, or the like, for high-speed data transfer. In an embodiment, the PPU 300 incorporates U memory interfaces 470, one memory interface 470 per pair of memory partition units 380, where each pair of memory partition units 380 is connected to a corresponding memory device 304. For example, PPU 300 may be connected to up to Y memory devices 304, such as high bandwidth memory stacks or graphics double-data-rate, version 5, synchronous dynamic random access memory, or other types of persistent storage.

In an embodiment, the memory interface 470 implements an HBM2 memory interface and Y equals half U. In an embodiment, the HBM2 memory stacks are located on the same physical package as the PPU 300, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 304 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 300 process very large datasets and/or run applications for extended periods.

In an embodiment, the PPU 300 implements a multi-level memory hierarchy. In an embodiment, the memory partition unit 380 supports a unified memory to provide a single unified virtual address space for CPU and PPU 300 memory, enabling data sharing between virtual memory systems. In an embodiment the frequency of accesses by a PPU 300 to memory located on other processors is traced to ensure that memory pages are moved to the physical memory of the PPU 300 that is accessing the pages more frequently. In an embodiment, the NVLink 310 supports address translation services allowing the PPU 300 to directly access a CPU's page tables and providing full access to CPU memory by the PPU 300.

In an embodiment, copy engines transfer data between multiple PPUs 300 or between PPUs 300 and CPUs. The copy engines can generate page faults for addresses that are not mapped into the page tables. The memory partition unit 380 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 304 or other system memory may be fetched by the memory partition unit 380 and stored in the L2 cache 460, which is located on-chip and is shared between the various GPCs 350. As shown, each memory partition unit 380 includes a portion of the L2 cache 460 associated with a corresponding memory device 304. Lower level caches may then be implemented in various units within the GPCs 350. For example, each of the SMs 440 may implement a level one (L) cache. The L1 cache is private memory that is dedicated to a particular SM 440. Data from the L2 cache 460 may be fetched and stored in each of the L1 caches for processing in the functional units of the SMs 440. The L2 cache 460 is coupled to the memory interface 470 and the XBar 370.

The ROP unit 450 performs graphics raster operations related to pixel color, such as color compression, pixel blending, and the like. The ROP unit 450 also implements depth testing in conjunction with the raster engine 425, receiving a depth for a sample location associated with a pixel fragment from the culling engine of the raster engine 425. The depth is tested against a corresponding depth in a depth buffer for a sample location associated with the fragment. If the fragment passes the depth test for the sample location, then the ROP unit 450 updates the depth buffer and transmits a result of the depth test to the raster engine 425. It will be appreciated that the number of memory partition units 380 may be different than the number of GPCs 350 and, therefore, each ROP unit 450 may be coupled to each of the GPCs 350. The ROP unit 450 tracks packets received from the different GPCs 350 and determines which GPC 350 that a result generated by the ROP unit 450 is routed to through the Xbar 370. Although the ROP unit 450 is included within the memory partition unit 380 in FIG. 4B, in other embodiment, the ROP unit 450 may be outside of the memory partition unit 380. For example, the ROP unit 450 may reside in the GPC 350 or another unit.

Figure 5A:
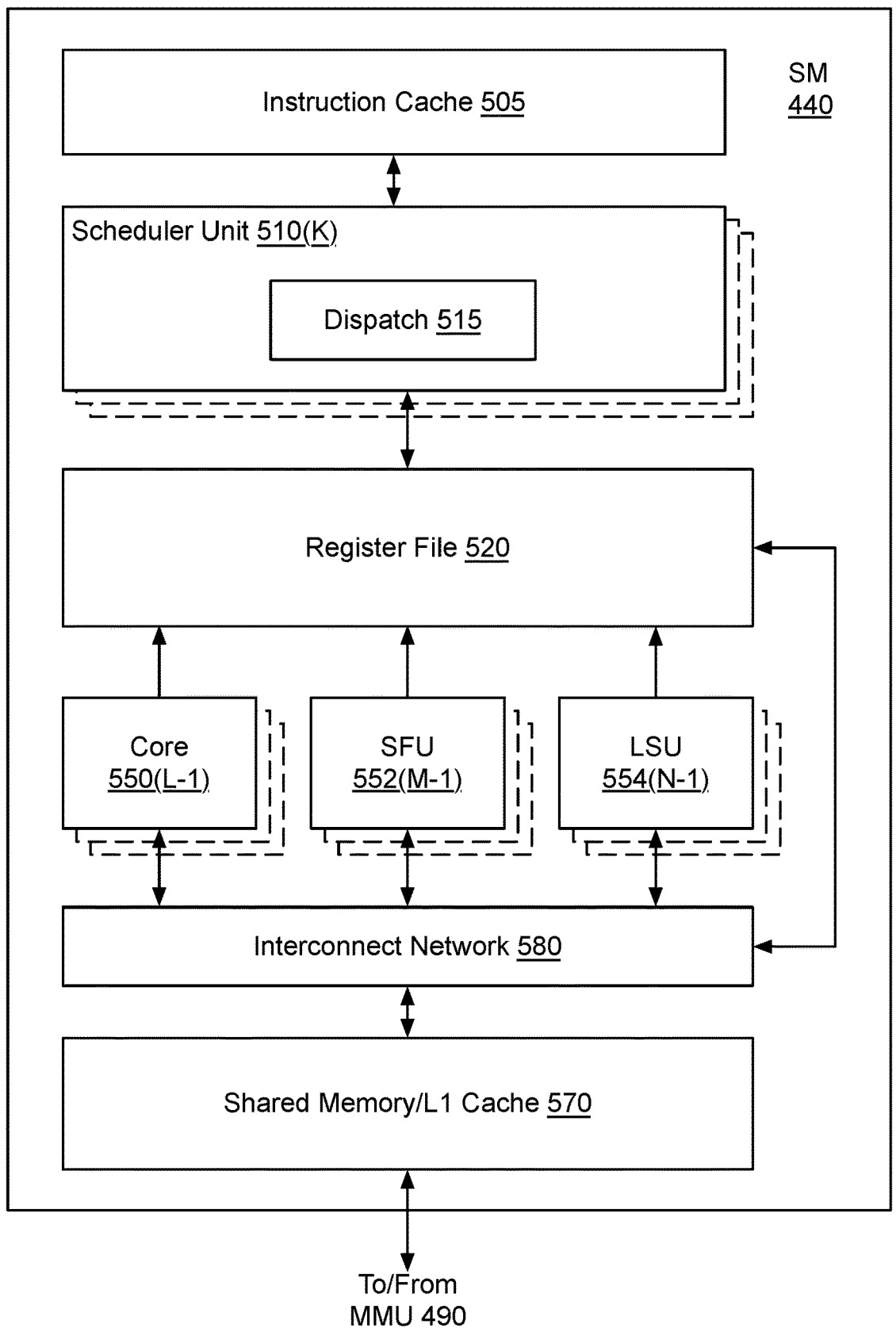
FIG. 5A illustrates the streaming multi-processor of FIG. 4A, in accordance with an embodiment.

FIG. 5A illustrates the streaming multi-processor 440 of FIG. 4A, in accordance with an embodiment. As shown in FIG. 5A, the SM 440 includes an instruction cache 505, one or more scheduler units 510, a register file 520, one or more processing cores 550, one or more special function units (SFUs) 552, one or more load/store units (LSUs) 554, an interconnect network 580, a shared memory/L1 cache 570.

As described above, the work distribution unit 325 dispatches tasks for execution on the GPCs 350 of the PPU 300. The tasks are allocated to a particular DPC 420 within a GPC 350 and, if the task is associated with a shader program, the task may be allocated to an SM 440. The scheduler unit 510 receives the tasks from the work distribution unit 325 and manages instruction scheduling for one or more thread blocks assigned to the SM 440. The scheduler unit 510 schedules thread blocks for execution as warps of parallel threads, where each thread block is allocated at least one warp. In an embodiment, each warp executes 32 threads. The scheduler unit 510 may manage a plurality of different thread blocks, allocating the warps to the different thread blocks and then dispatching instructions from the plurality of different cooperative groups to the various functional units (e.g., cores 550, SFUs 552, and LSUs 554) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch unit 515 is configured to transmit instructions to one or more of the functional units. In the embodiment, the scheduler unit 510 includes two dispatch units 515 that enable two different instructions from the same warp to be dispatched during each clock cycle. In alternative embodiments, each scheduler unit 510 may include a single dispatch unit 515 or additional dispatch units 515.

Each SM 440 includes a register file 520 that provides a set of registers for the functional units of the SM 440. In an embodiment, the register file 520 is divided between each of the functional units such that each functional unit is allocated a dedicated portion of the register file 520. In another embodiment, the register file 520 is divided between the different warps being executed by the SM 440. The register file 520 provides temporary storage for operands connected to the data paths of the functional units.

Each SM 440 comprises L processing cores 550. In an embodiment, the SM 440 includes a large number (e.g., 128, etc.) of distinct processing cores 550. Each core 550 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 550 include 64 single-precision (32-bit) floating point cores, 64 integer cores, 32 double-precision (64-bit) floating point cores, and 8 tensor cores.

Tensor cores configured to perform matrix operations, and, in an embodiment, one or more tensor cores are included in the cores 550. In particular, the tensor cores are configured to perform deep learning matrix arithmetic, such as convolution operations for neural network training and inferencing. In an embodiment, each tensor core operates on a 4×4 matrix and performs a matrix multiply and accumulate operation $D=A\times B+C$, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each SM 440 also comprises M SFUs 552 that perform special functions (e.g., attribute evaluation, reciprocal square root, and the like). In an embodiment, the SFUs 552 may include a tree traversal unit configured to traverse a hierarchical tree data structure. In an embodiment, the SFUs 552 may include texture unit configured to perform texture map filtering operations. In an embodiment, the texture units are configured to load texture maps (e.g., a 2D array of texels) from the memory 304 and sample the texture maps to produce sampled texture values for use in shader programs executed by the SM 440. In an embodiment, the texture maps are stored in the shared memory/L1 cache 470. The texture units implement texture operations such as filtering operations using mip-maps (e.g., texture maps of varying levels of detail). In an embodiment, each SM 340 includes two texture units.

Each SM 440 also comprises N LSUs 554 that implement load and store operations between the shared memory/L1 cache 570 and the register file 520. Each SM 440 includes an interconnect network 580 that connects each of the functional units to the register file 520 and the LSU 554 to the register file 520, shared memory/L1 cache 570. In an embodiment, the interconnect network 580 is a crossbar that can be configured to connect any of the functional units to any of the registers in the register file 520 and connect the LSUs 554 to the register file and memory locations in shared memory/L1 cache 570.

The shared memory/L1 cache 570 is an array of on-chip memory that allows for data storage and communication between the SM 440 and the primitive engine 435 and between threads in the SM 440. In an embodiment, the shared memory/L1 cache 570 comprises 128 KB of storage capacity and is in the path from the SM 440 to the memory partition unit 380. The shared memory/L1 cache 570 can be used to cache reads and writes. One or more of the shared memory/L1 cache 570, L2 cache 460, and memory 304 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 570 enables the shared memory/L1 cache 570 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 3, are bypassed, creating a much simpler programming model. In the general purpose parallel computation configuration, the work distribution unit 325 assigns and distributes blocks of threads directly to the DPCs 420. The threads in a block execute the same program, using a unique thread ID in the calculation to ensure each thread generates unique results, using the SM 440 to execute the program and perform calculations, shared memory/L1 cache 570 to communicate between threads, and the LSU 554 to read and write global memory through the shared memory/L1 cache 570 and the memory partition unit 380. When configured for general purpose parallel computation, the SM 440 can also write commands that the scheduler unit 320 can use to launch new work on the DPCs 420.

The PPU 300 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 300 is embodied on a single semiconductor substrate. In another embodiment, the PPU 300 is included in a system-on-a-chip (SoC) along with one or more other devices such as additional PPUs 300, the memory 204, a reduced instruction set computer (RISC) CPU, a memory management unit (MMU), a digital-to-analog converter (DAC), and the like.

In an embodiment, the PPU 300 may be included on a graphics card that includes one or more memory devices 304. The graphics card may be configured to interface with a PCIe slot on a motherboard of a desktop computer. In yet another embodiment, the PPU 300 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5B:
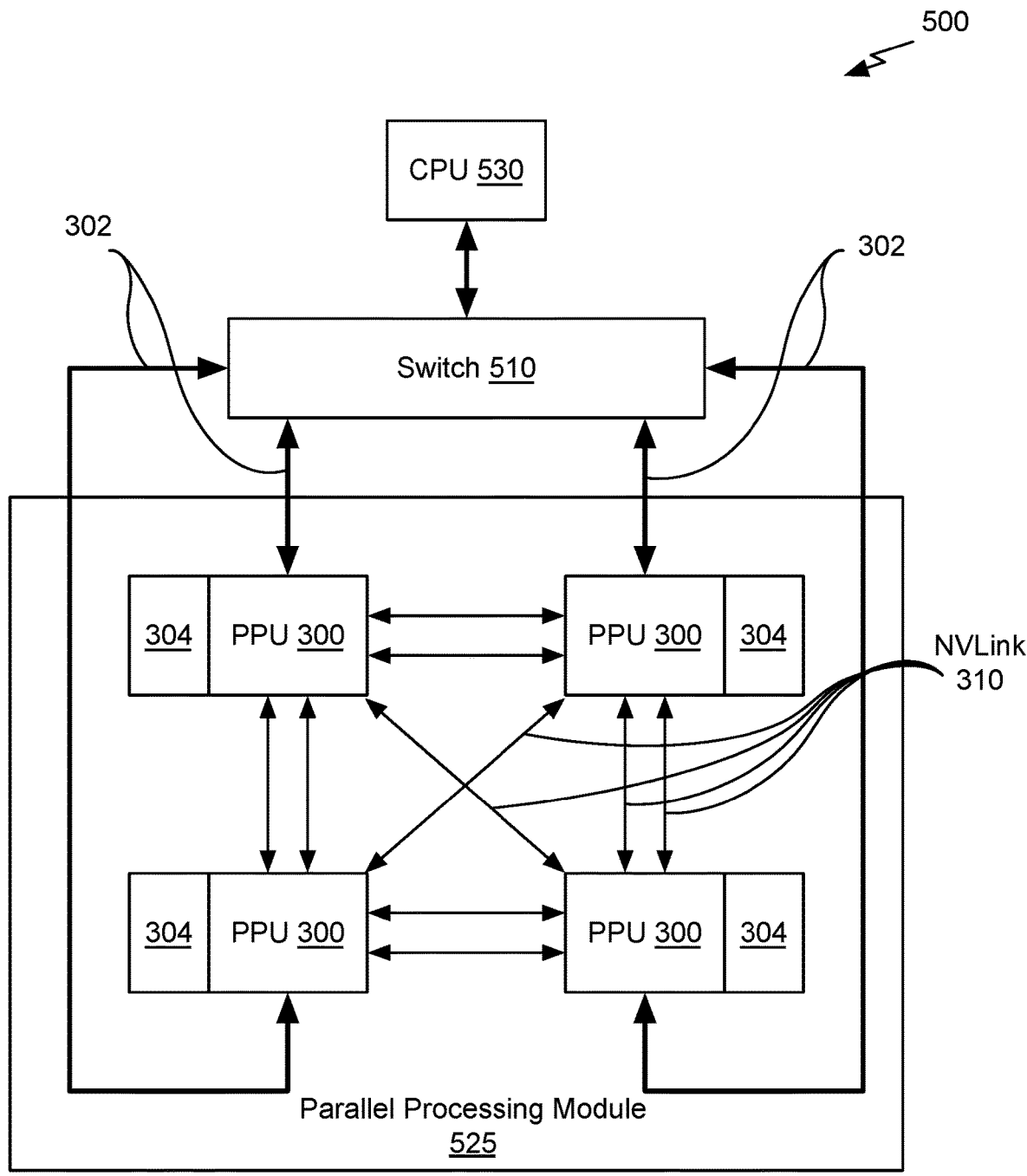
FIG. 5B is a conceptual diagram of a processing system implemented using the PPU of FIG. 3, in accordance with an embodiment.

FIG. 5B is a conceptual diagram of a processing system 500 implemented using the PPU 300 of FIG. 3, in accordance with an embodiment. The exemplary system 565 may be configured to implement the parallel neural network system 100 shown in FIG. 1A. The processing system 500 includes a CPU 530, switch 510, and multiple PPUs 300 each and respective memories 304. The NVLink 310 provides high-speed communication links between each of the PPUs 300. Although a particular number of NVLink 310 and interconnect 302 connections are illustrated in FIG. 5B, the number of connections to each PPU 300 and the CPU 530 may vary. The switch 510 interfaces between the interconnect 302 and the CPU 530. The PPUs 300, memories 304, and NVLinks 310 may be situated on a single semiconductor platform to form a parallel processing module 525. In an embodiment, the switch 510 supports two or more protocols to interface between various different connections and/or links.

In another embodiment (not shown), the NVLink 310 provides one or more high-speed communication links between each of the PPUs 300 and the CPU 530 and the switch 510 interfaces between the interconnect 302 and each of the PPUs 300. The PPUs 300, memories 304, and interconnect 302 may be situated on a single semiconductor platform to form a parallel processing module 525. In yet another embodiment (not shown), the interconnect 302 provides one or more communication links between each of the PPUs 300 and the CPU 530 and the switch 510 interfaces between each of the PPUs 300 using the NVLink 310 to provide one or more high-speed communication links between the PPUs 300. In another embodiment (not shown), the NVLink 310 provides one or more high-speed communication links between the PPUs 300 and the CPU 530 through the switch 510. In yet another embodiment (not shown), the interconnect 302 provides one or more communication links between each of the PPUs 300 directly. One or more of the NVLink 310 high-speed communication links may be implemented as a physical NVLink interconnect or either an on-chip or on-die interconnect using the same protocol as the NVLink 310.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 300 and/or memories 304 may be packaged devices. In an embodiment, the CPU 530, switch 510, and the parallel processing module 525 are situated on a single semiconductor platform.

In an embodiment, the signaling rate of each NVLink 310 is 20 to 25 Gigabits/second and each PPU 300 includes six NVLink 310 interfaces (as shown in FIG. 5B, five NVLink 310 interfaces are included for each PPU 300). Each NVLink 310 provides a data transfer rate of 25 Gigabytes/second in each direction, with six links providing 300 Gigabytes/second. The NVLinks 310 can be used exclusively for PPU-to-PPU communication as shown in FIG. 5B, or some combination of PPU-to-PPU and PPU-to-CPU, when the CPU 530 also includes one or more NVLink 310 interfaces.

In an embodiment, the NVLink 310 allows direct load/store/atomic access from the CPU 530 to each PPU's 300 memory 304. In an embodiment, the NVLink 310 supports coherency operations, allowing data read from the memories 304 to be stored in the cache hierarchy of the CPU 530, reducing cache access latency for the CPU 530. In an embodiment, the NVLink 310 includes support for Address Translation Services (ATS), allowing the PPU 300 to directly access page tables within the CPU 530. One or more of the NVLinks 310 may also be configured to operate in a low-power mode.

Figure 5C:
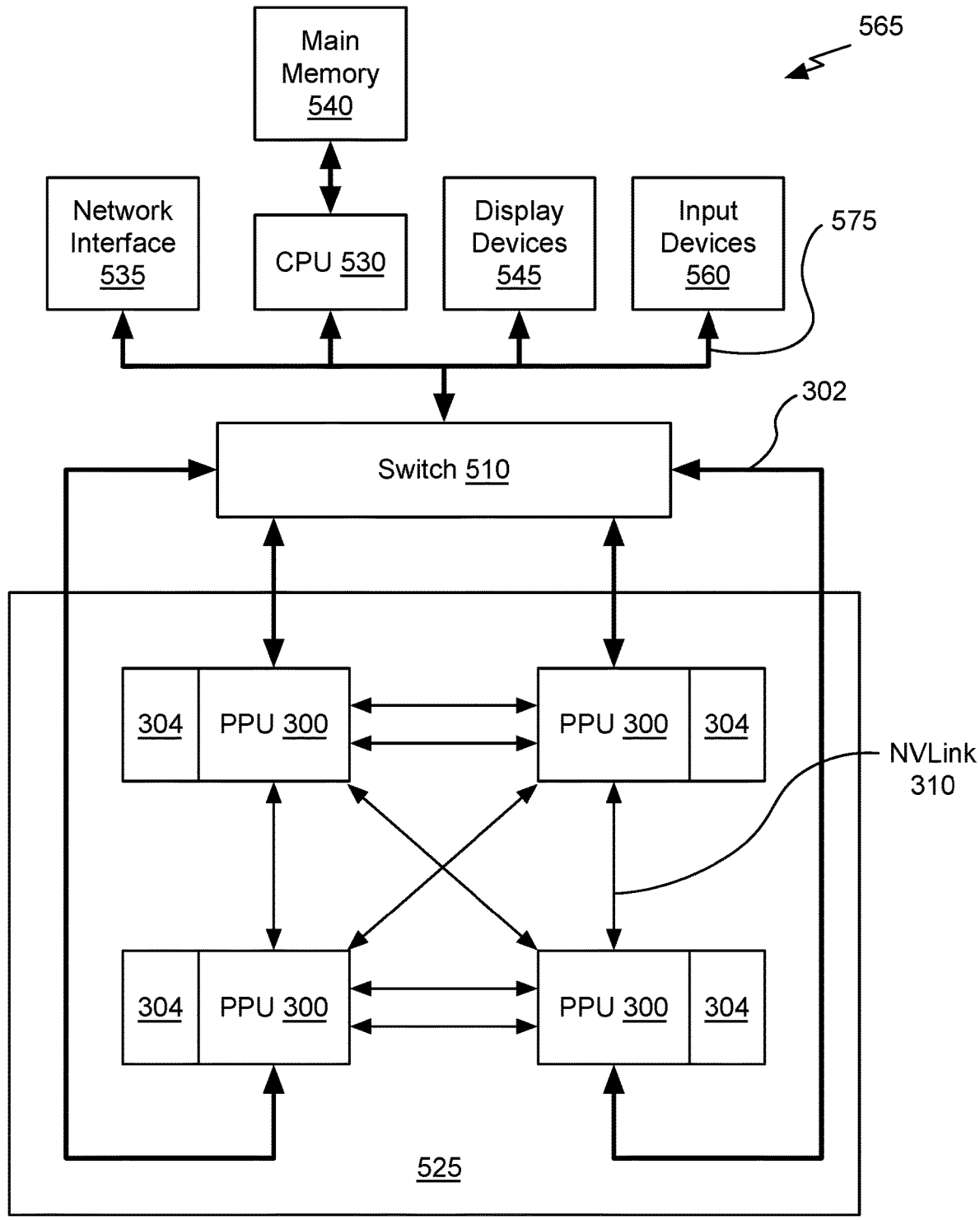
FIG. 5C illustrates an exemplary system in which the various architecture and/or functionality of the various previous embodiments may be implemented.

FIG. 5C illustrates an exemplary system 565 in which the various architecture and/or functionality of the various previous embodiments may be implemented. The exemplary system 565 may be configured to implement the parallel neural network system 100 shown in FIG. 1A.

As shown, a system 565 is provided including at least one central processing unit 530 that is connected to a communication bus 575. The communication bus 575 may be implemented using any suitable protocol, such as PCI (Peripheral Component Interconnect), PCI-Express, AGP (Accelerated Graphics Port), HyperTransport, or any other bus or point-to-point communication protocol(s). The system 565 also includes a main memory 540. Control logic (software) and data are stored in the main memory 540 which may take the form of random access memory (RAM).

The system 565 also includes input devices 560, the parallel processing system 525, and display devices 545, e.g. a conventional CRT (cathode ray tube), LCD (liquid crystal display), LED (light emitting diode), plasma display or the like. User input may be received from the input devices 560, e.g., keyboard, mouse, touchpad, microphone, and the like. Each of the foregoing modules and/or devices may even be situated on a single semiconductor platform to form the system 565. Alternately, the various modules may also be situated separately or in various combinations of semiconductor platforms per the desires of the user.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes.

The system 565 may also include a secondary storage (not shown). The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 540 and/or the secondary storage. Such computer programs, when executed, enable the system 565 to perform various functions. The memory 540, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 565 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Machine Learning

Deep neural networks (DNNs) developed on processors, such as the PPU 300 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 300. Inferencing is less compute-intensive than training, being a latency-sensitive process where a trained neural network is applied to new inputs it has not seen before to classify images, translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 300 is a computing platform capable of delivering performance required for deep neural network-based artificial intelligence and machine learning applications.

What is claimed is:

1. A computer-implemented method, comprising:
identifying even processing layers and odd processing layers in a sequence of multiple processing layers included in a neural network model, wherein the sequence alternates between each of the odd processing layers and each of the even processing layers;
decoupling the odd processing layers and the even processing layers to produce a parallel neural network system comprising an even neural network model that includes the even processing layers in a first sequence and does not include the odd processing layers and a separate and independent odd neural network model that is decoupled from the even neural network model and includes the odd processing layers in a second sequence and does not include the even processing layers;
processing, based on a block bi-diagonal lower triangular system of equations, odd input data by the odd neural network model according to odd parameter values to produce an odd output and even input data by the even neural network model according to even parameter values to produce an even output;
updating the odd parameter values based on a first difference between the odd output and an odd ground truth output; and
updating the even parameter values based on a second difference between the even output and an even ground truth output.

2. The computer-implemented method of claim 1, further comprising simultaneously back propagating an odd error gradient through the odd neural network model to update the odd parameter values and back propagating an even error gradient through the even neural network model to update the even parameter values.

3. The computer-implemented method of claim 1, wherein processing the odd input data by the odd neural network model and the even input data by the even neural network model produces intermediate odd data between the odd processing layers and intermediate even data between the even processing layers.

4. The computer-implemented method of claim 3, wherein the intermediate odd data and the intermediate even data are mathematically equivalent to intermediate data computed by the neural network model including the multiple processing layers.

5. The computer-implemented method of claim 1, wherein the neural network model, the odd neural network model, and the even neural network model are feedforward neural network models.

6. The computer-implemented method of claim 1, wherein the neural network model, the odd neural network model, and the even neural network model are convolutional neural network models.

7. The computer-implemented method of claim 1, wherein the neural network model, the odd neural network model, and the even neural network model are recurrent neural network models.

8. The computer-implemented method of claim 1, further comprising recursively decoupling the even neural network model into a first even neural network model including only the even processing layers from the even neural network model and a second even neural network model including only the odd processing layers from the even neural network model.

9. The computer-implemented method of claim 1, wherein the odd neural network model and the even neural network model are implemented by a graphics processing unit included in at least one of an autonomous vehicle platform, image recognition system, text recognition system, computing system, and data center.

10. The computer-implemented method of claim 1, wherein the odd neural network model and the even neural network model are used for at least one of intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations.

11. A system, comprising:
a memory that stores an even ground truth output and an odd ground truth output; and
a processor that is connected to the memory, wherein the processor is configured to train a neural network model by:
identifying even processing layers and odd processing layers in a sequence of multiple processing layers included in a neural network model into odd processing layers and even processing layers, wherein the sequence alternates between each of the odd processing layers and each of the even processing layers;
decoupling the odd processing layers and the even processing layers to produce a parallel neural network system comprising an even neural network model that includes the even processing layers in a first sequence and does not include the odd processing layers and a separate and independent odd neural network model that is decoupled from the even neural network model and includes the odd processing layers in a second sequence and does not include the even processing layers;
processing, based on a block bi-diagonal lower triangular system of equations, odd input data by the odd neural network model according to odd parameter values to produce an odd output and processing even input data by the even neural network model according to even parameter values to produce an even output;
updating the odd parameter values based on a first difference between the odd output and an odd ground truth output; and updating the even parameter values based on a second difference between the even output and an even ground truth output.

12. The system of claim 11, further comprising simultaneously back propagating an odd error gradient through the odd neural network model to update the odd parameter values and back propagating an even error gradient through the even neural network model to update the even parameter values.

13. The system of claim 11, wherein the odd neural network model is configured to process the odd input data to produce intermediate odd data between the odd processing layers and process the even input data by the even neural network model to produce intermediate even data between the even processing layers.

14. The system of claim 13, wherein the intermediate odd data and the intermediate even data are mathematically equivalent to intermediate data computed by the neural network model including the multiple processing layers.

15. The system of claim 11, wherein the neural network model, the odd neural network model, and the even neural network model are feedforward neural network models.

16. The system of claim 11, wherein the neural network model, the odd neural network model, and the even neural network model are convolutional neural network models.

17. The system of claim 11, wherein the neural network model, the odd neural network model, and the even neural network model are recurrent neural network models.

18. The system of claim 11, wherein the even neural network model comprises a first even neural network model including only the even processing layers from the even neural network model and a second even neural network model including only the odd processing layers from the even neural network model.

19. A non-transitory computer-readable media storing computer instructions that, when executed by one or more processors, cause the one or more processors to perform the steps of:

identifying even processing layers and odd processing layers in a sequence of multiple processing layers included in a neural network model into odd processing layers and even processing layers, wherein the sequence alternates between each of the odd processing layers and each of the even processing layers;

decoupling the odd processing layers and the even processing layers to produce a parallel neural network system comprising an even neural network model that includes the even processing layers in a first sequence and does not include the odd processing layers and a separate and independent odd neural network model that is decoupled from the even neural network model and includes the odd processing layers in a second sequence and does not include the even processing layers;

processing, based on a block bi-diagonal lower triangular system of equations, odd input data by the odd neural network model according to odd parameter values to produce an odd output and processing even input data by the even neural network model according to even parameter values to produce an even output;

updating the odd parameter values based on a first difference between the odd output and an odd ground truth output; and updating the even parameter values based on a second difference between the even output and an even ground truth output.

20. The non-transitory computer-readable media of claim 19, further comprising simultaneously back propagating an odd error gradient through the odd neural network model to update the odd parameter values and back propagating an even error gradient through the even neural network model to update the even parameter values.

* * * * *